(12) United States Patent
Hill et al.

(10) Patent No.: US 11,950,584 B1
(45) Date of Patent: Apr. 9, 2024

(54) FISHING ROD HOLDERS AND FISHING RODS INCLUDING THE SAME

(71) Applicants: Matthew Scott Hill, Crestline, CA (US); Roy Charles Hill, Coffman Cove, AK (US)

(72) Inventors: Matthew Scott Hill, Crestline, CA (US); Roy Charles Hill, Coffman Cove, AK (US)

( * ) Notice: Subject to any disclaimer, the term of this patent is extended or adjusted under 35 U.S.C. 154(b) by 0 days.

(21) Appl. No.: 18/460,543

(22) Filed: Sep. 2, 2023

(51) Int. Cl.
*A01K 97/10* (2006.01)
*A01K 87/00* (2006.01)
*A01K 87/08* (2006.01)

(52) U.S. Cl.
CPC ............ *A01K 97/10* (2013.01); *A01K 87/007* (2013.01); *A01K 87/08* (2013.01)

(58) Field of Classification Search
CPC ...... A01K 97/10; A01K 87/007; A01K 87/08; A01K 87/008
USPC ............ 43/21.2, 23; 248/511, 530, 532, 533
See application file for complete search history.

(56) References Cited

U.S. PATENT DOCUMENTS

| | | | | |
|---|---|---|---|---|
| 122,218 A * | 12/1871 | Bogert | .................. | A45B 3/00 473/46 |
| 849,481 A * | 4/1907 | Lobit | .................. | A45B 3/00 43/18.1 R |
| 1,020,044 A * | 3/1912 | Mcguire | .................. | A45B 3/16 135/65 |
| 1,092,548 A * | 4/1914 | Weber | .................. | A01K 97/10 248/688 |
| 1,577,612 A * | 3/1926 | Dees | .................. | A01K 97/10 248/165 |
| 1,972,518 A * | 9/1934 | Grandjean | .................. | A01K 87/025 43/18.1 CT |
| 2,241,183 A * | 5/1941 | Ceder | .................. | A01K 97/10 43/23 |
| 2,360,402 A * | 10/1944 | Determan | .................. | A01K 97/10 43/25 |
| 2,431,972 A * | 12/1947 | Treadway | .................. | A01K 87/08 43/22 |
| 2,466,166 A | 4/1949 | Fischer | | |
| 2,546,079 A * | 3/1951 | Seviola | .................. | A01K 97/01 43/18.1 CT |
| 2,612,334 A * | 9/1952 | Delamere | .................. | A01K 97/10 43/21.2 |

(Continued)

FOREIGN PATENT DOCUMENTS

| GB | 2581978 A | * | 9/2020 | ............ A01K 97/10 |
|---|---|---|---|---|
| JP | 2006197858 A | * | 8/2006 | |

(Continued)

*Primary Examiner* — Darren W Ark
(74) *Attorney, Agent, or Firm* — Hoofe IP Law PC

(57) ABSTRACT

A fishing rod holder includes a tubular member capable of removably holding a fishing rod thereon. The tubular member includes a first annular wall enclosing a longitudinally extending first cavity portion and a second annular wall enclosing a longitudinally extending second cavity portion. The second annular wall includes an internally-threaded end portion at one end. The fishing rod holder also includes a spike detachably affixable to the tubular member. The spike has a stored configuration and a deployed configuration. At least a portion of the spike is disposed in the second cavity portion when in the stored configuration.

15 Claims, 11 Drawing Sheets

(56) References Cited

U.S. PATENT DOCUMENTS

| | | | |
|---|---|---|---|
| 2,628,445 A * | 2/1953 | Lawrenz | A01K 87/00 43/21.2 |
| 2,665,866 A * | 1/1954 | Goldinger | A01K 97/10 248/156 |
| 2,681,779 A * | 6/1954 | Veschio | A01K 97/10 248/533 |
| 3,033,502 A * | 5/1962 | Silver | A01K 97/10 248/538 |
| 3,073,055 A * | 1/1963 | Edwards | A01K 87/08 43/23 |
| 3,150,460 A * | 9/1964 | Dees | A01K 97/00 43/18.1 R |
| 3,339,869 A | 9/1967 | Andersen | |
| 3,443,335 A | 5/1969 | Guydos | |
| 3,898,756 A * | 8/1975 | Tolle | A01M 17/00 D22/148 |
| 3,903,633 A * | 9/1975 | Hutcherson | A01K 97/10 43/17 |
| 3,924,345 A * | 12/1975 | Sapp | A01K 97/10 248/156 |
| 4,048,743 A * | 9/1977 | Lapinski | A01K 97/125 43/18.1 R |
| 4,077,148 A | 3/1978 | Carey | |
| 4,083,141 A | 4/1978 | Shedd | |
| 4,131,122 A * | 12/1978 | Brooks | A45B 9/02 135/79 |
| 4,257,181 A | 3/1981 | Cooper | |
| 4,261,128 A * | 4/1981 | Dobbins | A01K 97/10 248/514 |
| 4,403,439 A | 9/1983 | Wallace | |
| 4,407,089 A | 10/1983 | Miller | |
| 4,443,963 A * | 4/1984 | Braaten | A01K 97/10 43/21.2 |
| 4,471,553 A | 9/1984 | Copeland | |
| 4,577,432 A | 3/1986 | Brackett | |
| 4,650,146 A | 3/1987 | Duke | |
| 4,658,534 A * | 4/1987 | McLean | A01K 97/10 43/21.2 |
| 4,748,762 A * | 6/1988 | Campbell | A01K 97/10 248/533 |
| 4,869,011 A * | 9/1989 | Whiting | A01K 87/08 43/23 |
| 4,972,621 A * | 11/1990 | Tucker | A01K 97/10 43/21.2 |
| 5,444,934 A * | 8/1995 | LaTouche | A01K 87/00 43/18.1 CT |
| 5,639,057 A * | 6/1997 | Yeomans | A01K 97/10 248/530 |
| 5,724,763 A | 3/1998 | Rasmussen | |
| 5,956,883 A | 9/1999 | Krouth | |
| 6,115,955 A * | 9/2000 | Sledge | A01K 87/08 43/23 |
| 6,126,696 A * | 10/2000 | Casto | A01K 87/08 623/65 |
| 6,216,998 B1 * | 4/2001 | Butrymowicz | A01K 97/10 248/530 |
| 6,318,017 B1 * | 11/2001 | Genardo | A01K 97/10 43/21.2 |
| 6,318,018 B1 * | 11/2001 | Weaver | A01K 97/10 43/21.2 |
| 6,341,756 B1 * | 1/2002 | Morris | A01K 97/10 248/533 |
| 6,571,507 B2 | 6/2003 | Elford | |
| 7,059,740 B2 * | 6/2006 | Opolka | F21V 21/0824 362/153.1 |
| 7,210,264 B1 * | 5/2007 | Demetris | A01K 97/24 43/25 |
| 7,568,306 B1 * | 8/2009 | Rice, Sr. | A01K 97/10 248/530 |
| 8,146,287 B2 * | 4/2012 | Brooks | A01K 87/08 248/530 |
| 8,156,681 B2 | 4/2012 | Carnevali | |
| 8,783,748 B1 | 7/2014 | Quinn | |
| 9,480,244 B2 | 11/2016 | Cooper | |
| D892,261 S | 8/2020 | Brooks | |
| D897,488 S | 9/2020 | Brooks | |
| 11,445,713 B2 | 9/2022 | Truitt | |
| 2004/0118031 A1 | 6/2004 | Nielson | |
| 2006/0101705 A1 * | 5/2006 | Sanders | A01K 97/10 43/25 |
| 2009/0119969 A1 * | 5/2009 | Cavanaugh | A01K 97/10 43/21.2 |
| 2010/0050495 A1 * | 3/2010 | Brooks | A01K 87/007 43/4.5 |
| 2010/0200724 A1 * | 8/2010 | Kukuk | A45B 25/00 248/530 |
| 2011/0113673 A1 * | 5/2011 | Huang | A01K 87/08 43/23 |
| 2011/0154714 A1 | 6/2011 | Rieck | |
| 2011/0302820 A1 * | 12/2011 | Gouthro | A01K 97/10 43/17 |
| 2012/0017487 A1 * | 1/2012 | O'Keefe | A01K 97/10 43/21.2 |
| 2013/0000178 A1 * | 1/2013 | Neeley | A01K 87/02 43/22 |
| 2014/0137459 A1 * | 5/2014 | Mora | A01K 97/10 43/17 |
| 2014/0317990 A1 | 10/2014 | Spiegel | |
| 2015/0040462 A1 | 2/2015 | Tjeerdsma | |
| 2023/0015639 A1 | 1/2023 | Truitt | |

FOREIGN PATENT DOCUMENTS

| | | | |
|---|---|---|---|
| JP | 2016198030 A * | 12/2016 | |
| JP | 6169470 B2 * | 7/2017 | |
| KR | 100691733 B1 * | 3/2007 | |
| KR | 200441837 Y1 * | 9/2008 | |
| KR | 100994290 B1 * | 11/2010 | |
| KR | 101119663 B1 * | 3/2012 | |
| KR | 20130002337 U * | 4/2013 | |
| KR | 20150054325 A * | 5/2015 | |

* cited by examiner

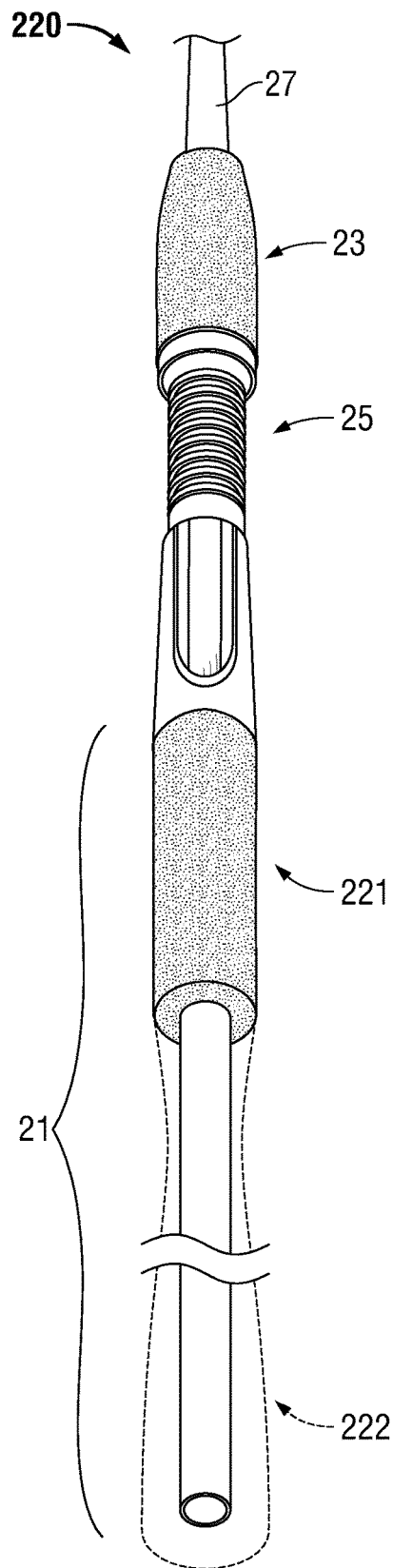
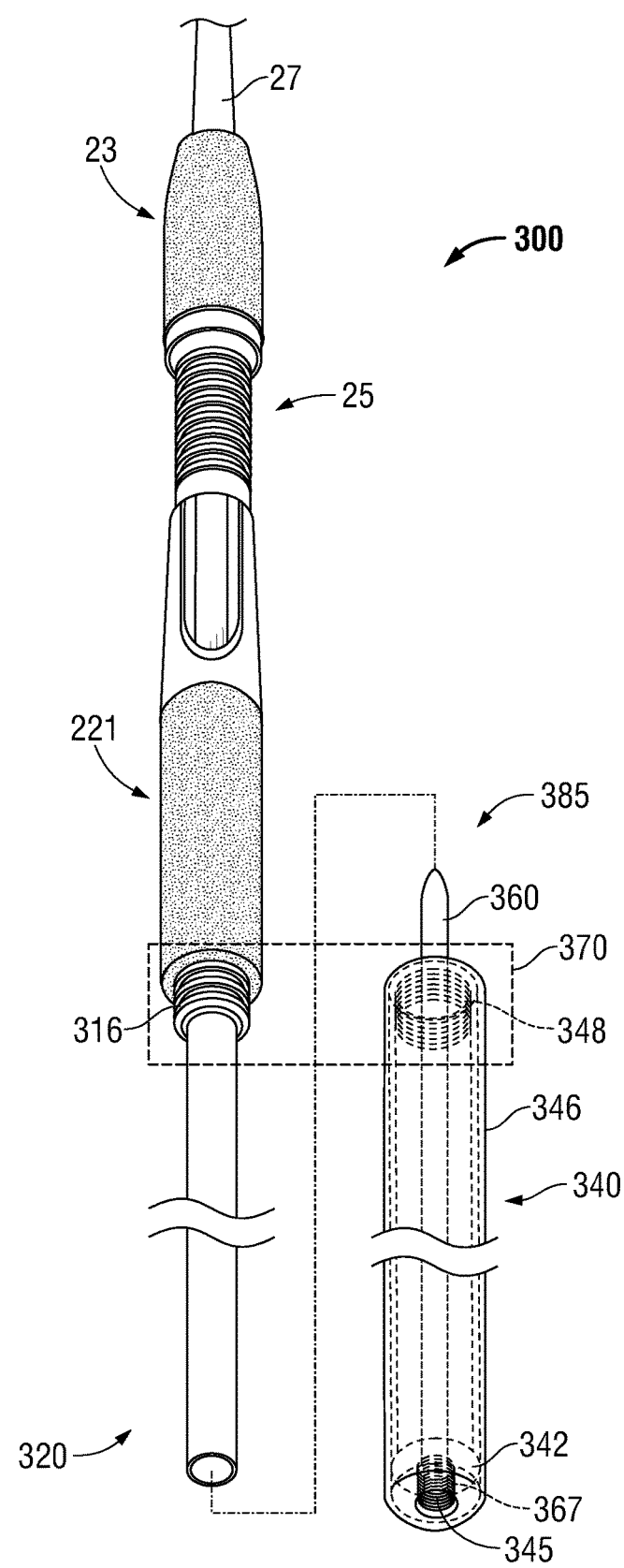
FIG. 11
FIG. 12

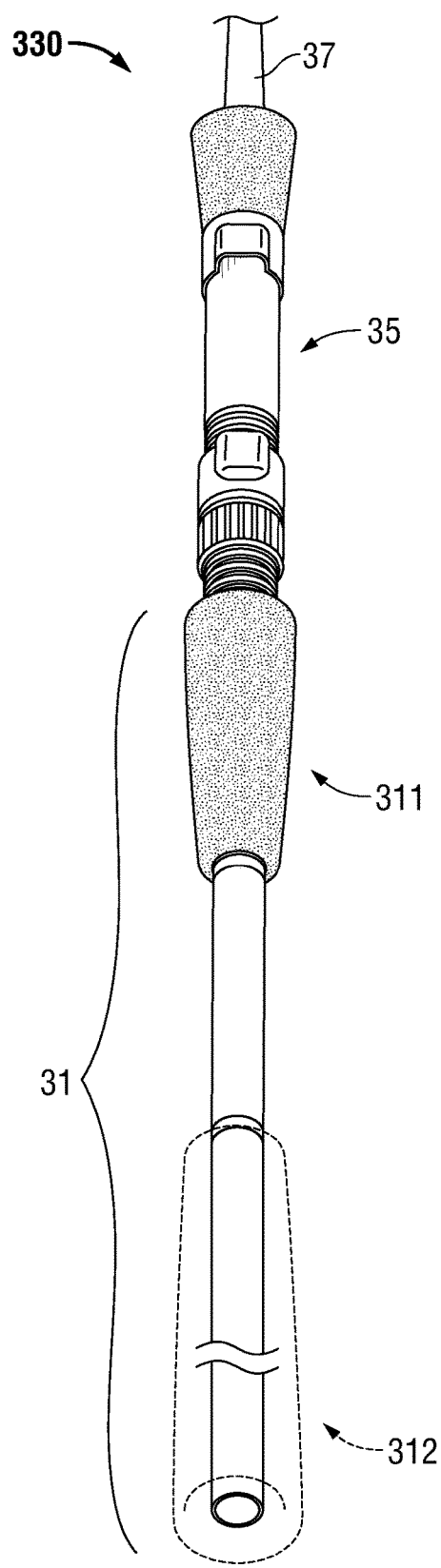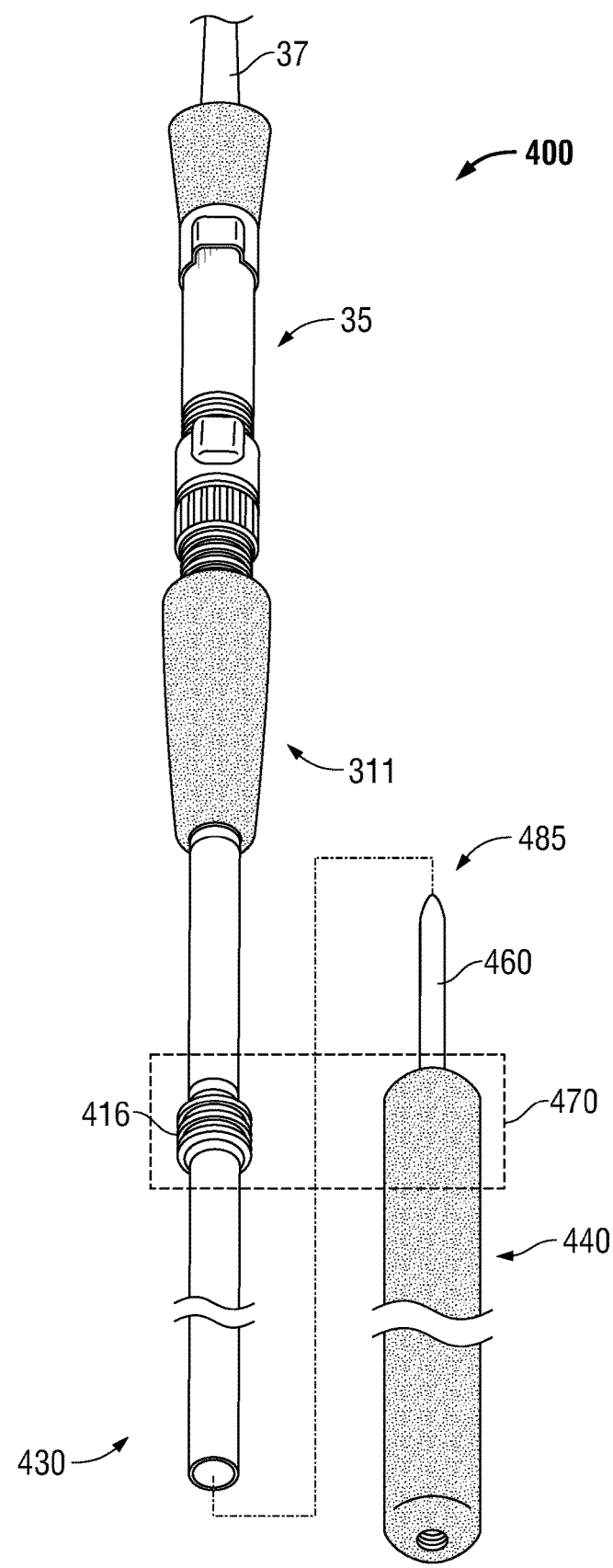
FIG. 13
FIG. 14

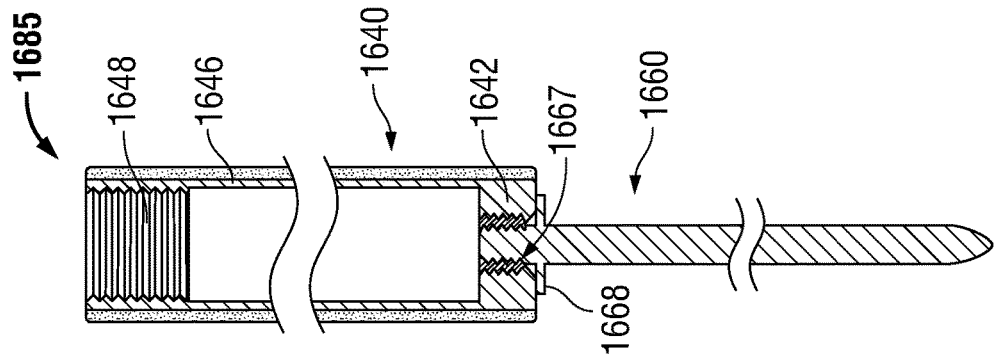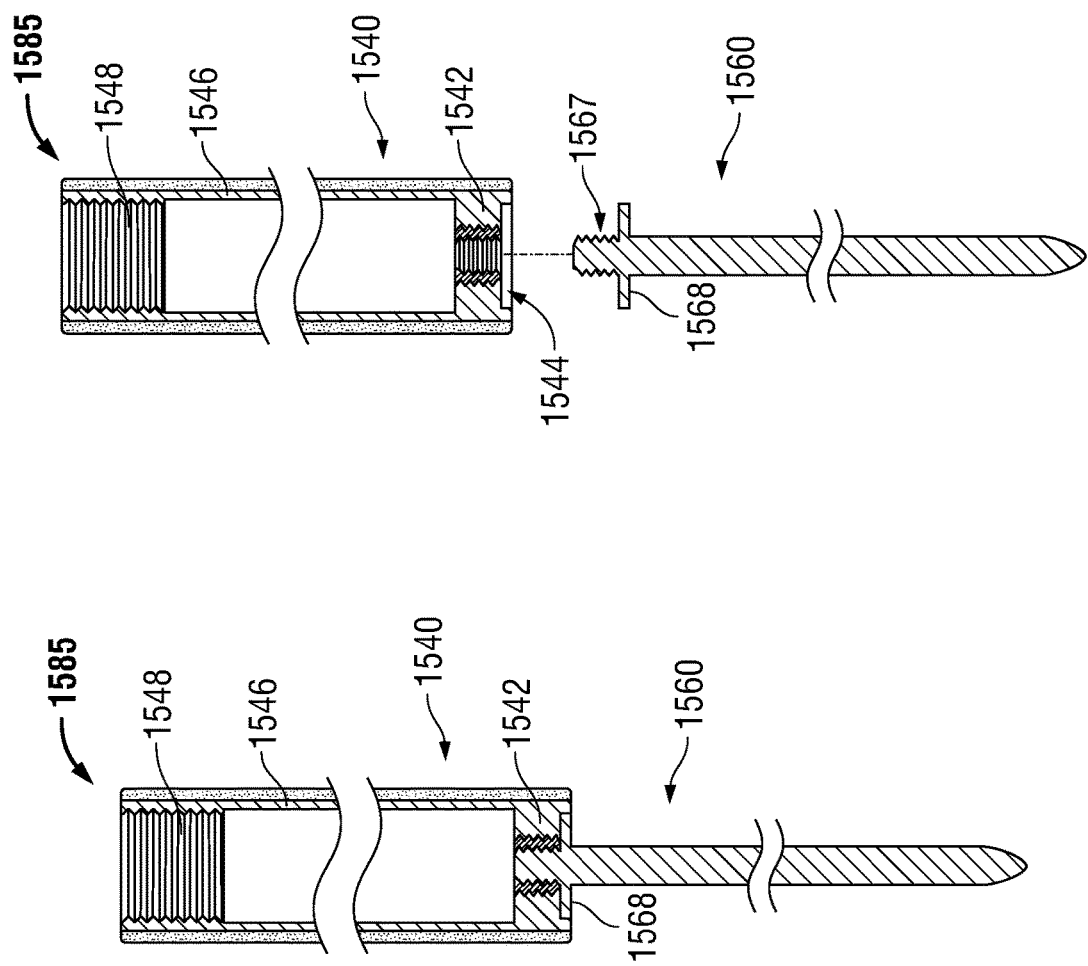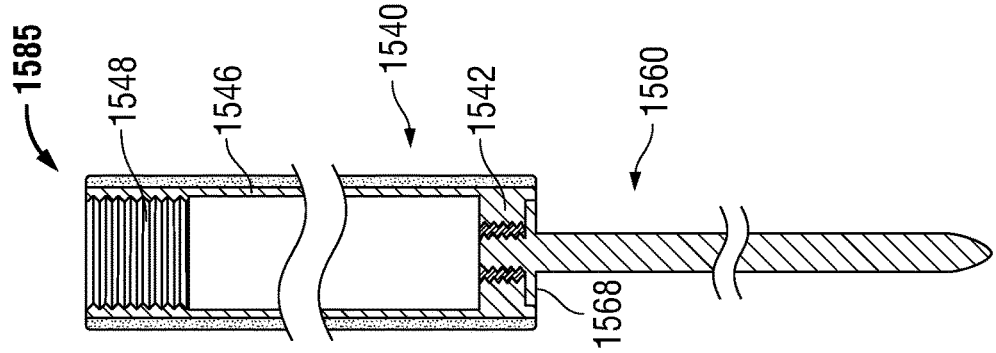

FISHING ROD HOLDERS AND FISHING RODS INCLUDING THE SAME

CROSS-REFERENCE TO RELATED APPLICATIONS

Not applicable.

BACKGROUND

1. Technical Field

The various exemplary embodiments of the disclosure relate generally to the field of fishing equipment and, more specifically, to fishing rod holders for use in conjunction with fishing rods.

2. Related Art

Fishing is a popular outdoor activity, supporting a multi-million-dollar industry. According to a report in 2020, for example, approximately fifty-five million Americans participated in freshwater, saltwater, and fly-fishing activities. The number of people participating in recreational fishing is recognized to be increasing on a global scale.

Among the components that make up a fishing rod are the rod blank, handle (also known as grip), reel seat, and guides. A rod blank is the long flexible pole component of a fishing rod, usually made of graphite, fiberglass, or composite materials. A fishing rod reel seat secures a reel to the rod blank. Examples of reel seats include spinning, casting, and fly rod reel seats. Heavy fishing rods usually use metal reel seats while lighter rods often use graphite seats. On a typical fishing rod, the part below where the reel seat is located is known as the grip, using which allows the fisher to hold and maneuver the rod. Split grip handles are one of the popular grips for fishing rods. Many anglers prefer the traditional full grip handles. Alternatively, pistol grip handles, usually found on casting rods, are much shorter than full or split grips. Whether a rod handle has a full grip or a split grip set up, often there is also a foregrip. The size, shape, location and material of the grip and the foregrip and the type and location of the reel seat is a matter of design choice and may differ from fishing rod to fishing rod.

Fishing is an activity practiced all over the world. Whether on a boat or from a bank, there are different techniques, styles, or methods when it comes to fishing. One of the most popular methods of fishing is bait fishing. Bait fishing is performed by casting out a form of artificial or live bait, suitable for the fish species being targeted. The angler then waits for a fish to strike the bait offering. During the substantial periods usually devoted to bait fishing, there can be considerable time between bites or strikes. While an angler is waiting for a fish to strike, the fishing rod is commonly placed into a rod holder, presenting viable options. A few examples of which include: hands-free convenience; the ability to use multiple fishing rods at the same time, increasing the chances of catching fish; and, by keeping the rod tip high, allow the angler to see when he or she is getting a bite.

A fishing rod holder can make fishing more enjoyable and even more successful. The role of a rod holder is not just to give a fisher's hands a break. Fishing rod holders range from a forked stick driven into the terrain alongside a body of water to tubes which can be embedded into the shore, or bank, of a body of water and to adjustable models mountable on fishing boats. Rod holders are particularly suitable for bait fishing. An example of a fishing rod holder useable for fishing from the shore is shown in FIGS. 1A-1C.

Referring to FIGS. 1A-1C, an example fishing rod holder includes an upper portion 1 adapted to support a fishing rod 9 (illustrated in phantom lines in FIG. 1C), an elongate member 2 having a pointed tip capable of being driven into the earth (illustrated in phantom lines in FIGS. 1B and 1C) and a triangular-shaped anchor plate 3 affixed to the elongate member 2. The triangular-shaped anchor plate 3 functions to anchor the rod holder in the sand or ground (illustrated in phantom lines in FIGS. 1B and 1C). Depending on how a bank or shore is sloped, a fisher can place the elongate member 2 with the affixed anchor plate 3 at an appropriate angle to suitably position the fishing rod 9 for fishing.

Many sporting goods stores and hunting and fishing retail stores offer a variety of fishing rod holders for freshwater or saltwater use. However, conventional fishing rod holders tend to be relatively bulky and cumbersome to carry. For many anglers, the need to store conventional fishing rod holders between fishing outings, and efforts to locate the rod holders when packing for an outing, can be wearisome. Fishing rod holders are an item easily forgotten when packing for a fishing trip.

There is a continuing need for improved fishing rod holders.

BRIEF SUMMARY

Various exemplary embodiments in accordance with the disclosure provide fishing rod holders. Exemplary embodiments of the disclosure provide a fishing rod including a fishing rod holder configured to be removably attachable to a proximal end portion of the fishing rod. Exemplary embodiments of the disclosure provide a fishing rod holder that is simple to manufacture, light in weight, durable, and capable of allowing quick and easy access, insertion, and removal of a fishing rod thereon and therefrom.

Various exemplary embodiments in accordance with the disclosure provide fishing rods including a fishing rod holder that eliminates the need to carry a separate rod holding device. Exemplary embodiments of the disclosure provide a fishing rod including a fishing rod holder that is easy to transport and capable of allowing quick and easy detachment of the fishing rod holder from a stored configuration in conjunction with the handle section of the fishing rod.

Various exemplary embodiments in accordance with the disclosure provide a fishing rod including a fishing rod holder configured to be detachably affixed to the fishing rod by a connection mechanism. Exemplary embodiments of the disclosure provide a fishing rod including a fishing rod holder configured to be removably attachable to a proximal end portion of a reel seat of the fishing rod. Exemplary embodiments of the disclosure provide a fishing rod including a fishing rod holder configured to be removably attachable to the fishing rod independent of a reel seat.

Exemplary embodiments of the disclosure provide a fishing rod holder including a spike having a stored configuration and a deployed configuration. Exemplary embodiments of the disclosure provide a fishing rod including a fishing rod holder including a spike that is concealed when the fishing rod holder is attached to a handle section of the fishing rod, which may allow the fishing rod to be used for all forms of fishing. Exemplary embodiments of the disclosure provide a fishing rod holder that is light in weight and does not affect the function of the fishing rod.

Exemplary embodiments of the disclosure may provide, or be part of, a fishing rod kit. The kit may provide one or more components for modifying a conventional fishing rod to allow a fishing rod holder in accordance with an exemplary embodiment of the disclosure to be detachably affixed to the modified fishing rod. According to an exemplary embodiment of the disclosure, a fishing rod kit includes an externally-threaded tubular connector configured to enclose a portion of the rod blank.

According to an exemplary embodiment of the disclosure, a fishing rod holder is provided. The fishing rod holder includes a tubular member capable of removably holding a fishing rod thereon. The tubular member also includes a first annular wall enclosing a longitudinally extending first cavity portion and a second annular wall enclosing a longitudinally extending second cavity portion. The second annular wall includes an internally-threaded end portion at one end. The fishing rod holder also includes a spike that is detachably affixable to the tubular member. The spike has a stored configuration and a deployed configuration. At least a portion of the spike is disposed in the second cavity portion when in the stored configuration.

According to an exemplary embodiment of the disclosure, a fishing rod is provided. The fishing rod includes a rod blank and a handle section that is associated with the rod blank. The fishing rod also includes a fishing rod holder that is removably attachable to a proximal portion of the handle section. The fishing rod holder includes a first annular wall enclosing a longitudinally extending first cavity portion and a second annular wall enclosing a longitudinally extending second cavity portion. The second cavity portion is sized and configured to receive a proximal end portion of the rod blank therein. The fishing rod holder also includes a spike. The spike includes a threaded portion. The spike has a stored configuration and a deployed configuration. The fishing rod also includes a connection mechanism that is configured to detachably affix the fishing rod holder to the proximal portion of the handle section.

According to an exemplary embodiment of the disclosure, a connection mechanism includes an externally-threaded tubular connector enclosing a portion of the rod blank.

According to an exemplary embodiment of the disclosure, a fishing rod is provided. The fishing rod includes a rod blank and a handle section that is associated with the rod blank. The handle section includes a reel seat. The fishing rod also includes a fishing rod holder that is removably attachable to a proximal portion of the handle section. The fishing rod holder includes a tubular member including a first annular wall enclosing a longitudinally extending first cavity portion and a second annular wall enclosing a longitudinally extending second cavity portion. The second annular wall includes an internally-threaded end portion. The fishing rod holder also includes a spike detachably affixable to the tubular member. The fishing rod also includes a connection mechanism that is configured to detachably affix the fishing rod holder to the proximal portion of the handle section.

It will be apparent to those of ordinary skill in the art that certain aspects of the fishing rod holders and fishing rods including a fishing rod holder described herein can be arranged and combined in a wide variety of different configurations, all of which are contemplated herein. The exemplary embodiments of fishing rod holders and fishing rods including a fishing rod holder described herein are not meant to be limiting.

The details of one or more exemplary embodiments are set forth in the description of the drawings below. Other features will be apparent from the description and drawings, and from the claims.

BRIEF DESCRIPTION OF THE DRAWINGS

Objects and features of the presently-disclosed fishing rod holders and fishing rods including a fishing rod holder will become apparent to those of ordinary skill in the art when descriptions of various exemplary embodiments thereof are read with reference to the accompanying drawings, of which:

FIG. 1A shows the fishing rod holder in an unemployed upright configuration, FIG. 1B shows the fishing rod holder disposed in an angled configuration with a portion thereof disposed in the earth as illustrated in phantom lines, and FIG. 1C illustrates use of the fishing rod holder in the angled configuration shown in FIG. 1B in conjunction with a fishing rod, with the fishing rod illustrated in phantom lines;

FIG. 2A shows a rod blank with a full grip disposed adjacent to a threaded portion of a reel seat at an end thereof, FIG. 2B shows a rod blank with a full grip disposed adjacent to a proximal portion of a hidden thread reel seat at an end thereof, and FIG. 2C shows a rod blank with a split grip disposed adjacent to a threaded portion of a reel seat at an end thereof;

FIG. 11 is a perspective view of the fishing rod of FIG. 2B shown absent a portion of the full grip handle, with the absent portion illustrated in phantom lines, and further showing an end portion of the rod blank, in accordance with an exemplary embodiment of the disclosure;

FIG. 12 is a perspective view of a fishing rod and fishing rod holder shown in a detached and spaced apart configuration in accordance with yet another exemplary embodiment of the disclosure;

FIG. 13 is a perspective view of the fishing rod of FIG. 2C shown absent a portion of the split grip handle, with the absent portion illustrated in phantom lines, in accordance with an exemplary embodiment of the disclosure;

FIG. 14 is a perspective view of a fishing rod and fishing rod holder shown in a detached and spaced apart configuration in accordance with still another exemplary embodiment of the disclosure;

FIGS. 15A and 15B are a perspective view of a fishing rod holder in accordance with an exemplary embodiment of the disclosure, where FIG. 15A shows a fishing rod holder with the spike in a deployed configuration, with the spike including a flange, and further showing a tubular member of the fishing rod holder having a cavity configured to receive the flange of the spike, and FIG. 15B shows the fishing rod holder of FIG. 15A with the spike including a flange detached and spaced apart from the tubular member;

FIG. 16 is a perspective view of a fishing rod holder in accordance with an exemplary embodiment of the disclosure, showing a spike of the fishing rod holder in a deployed configuration, and further showing the spike including a flange.

DETAILED DESCRIPTION

Figure 1A:
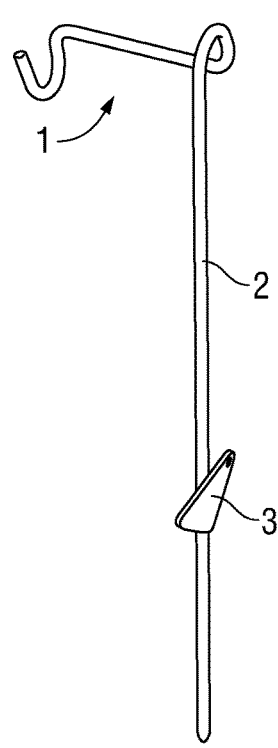
FIGS. 1A-1C are perspective views of a prior art fishing rod holder, where
Figure 1B:
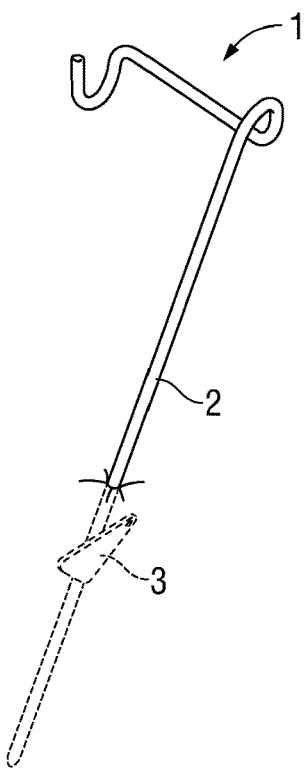
Figure 1C:
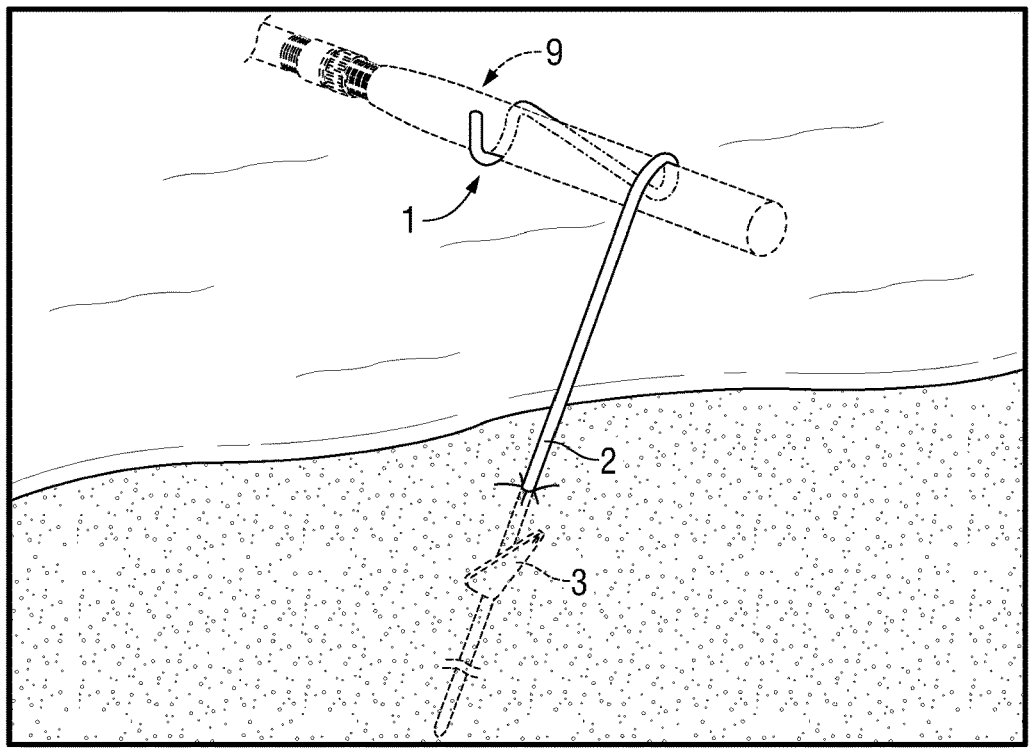

Hereinafter, exemplary embodiments of a fishing rod holder and exemplary embodiments of a fishing rod including a fishing rod holder are described with reference to the accompanying drawings. Like reference numerals may refer to similar or identical elements throughout the description of the figures. As shown in the drawings and as used in this description, and as is traditional when referring to relative positioning on an object, the term "proximal" refers to that portion of the apparatus, or component thereof, closer to the user and the term "distal" refers to that portion of the apparatus, or component thereof, farther from the user.

This description may use the phrases "in an exemplary embodiment," "in exemplary embodiments," "in some exemplary embodiments," or "in other exemplary embodiments," which may each refer to one or more of the same or different embodiments in accordance with the present disclosure. As used herein, the terms "comprises," "comprising," "includes," "including," "has," "having," "contains" or "containing," or any other variation thereof, are intended to cover a non-exclusive inclusion, such that a process, method, article, or apparatus that comprises a list of elements does not include only those elements but may include other elements not expressly listed or inherent to such process, method, article, or apparatus. Additionally, the term "exemplary" as used herein means "serving as an example, instance or illustration." Any embodiment or design described herein as "exemplary" is not necessarily to be construed as preferred or advantageous over other embodiments or designs. The terms "at least one" and "one or more" can be understood to include any integer number greater than or equal to one, i.e., one, two, three, four, etc.

It is to be understood that the terminology used herein is for the purpose of describing particular embodiments only, and is not intended to be limiting. As it is used in this description, the term "grip" refers to the part of a fishing rod that the fisher holds onto when he or she is fishing. As it is used in this description, "handle section" is a broad term that includes the grip but also encompasses the reel seat and other elements such as a foregrip and/or a butt cap, if any.

For the purposes of this description, the terms "angler," "fisher," and "fisherman" are used interchangeably. As it is used in this description, "a body of water" generally refers to oceans, seas, lakes, rivers, streams, creeks, and canals, but it may include smaller pools of water such as ponds and wetlands. As it is used in this description, the term "bank" generally refers to the land or terrain alongside a body of water.

It is to be understood that the following disclosure describes exemplary embodiments for implementing different features, structures, or functions of a fishing rod holder and exemplary embodiments for implementing different features, structures, or functions of a fishing rod including a fishing rod holder. Exemplary embodiments of components, arrangements, and configurations are described below to simplify the present disclosure; however, these embodiments are provided merely as examples and are not meant to be limiting. Accordingly, it should be apparent to those skilled in the art that the following description of exemplary embodiments of the present disclosure is provided for illustration purpose only and not for the purpose of limiting the scope of the present invention as defined by the appended claims and their equivalents.

Figure 2A:
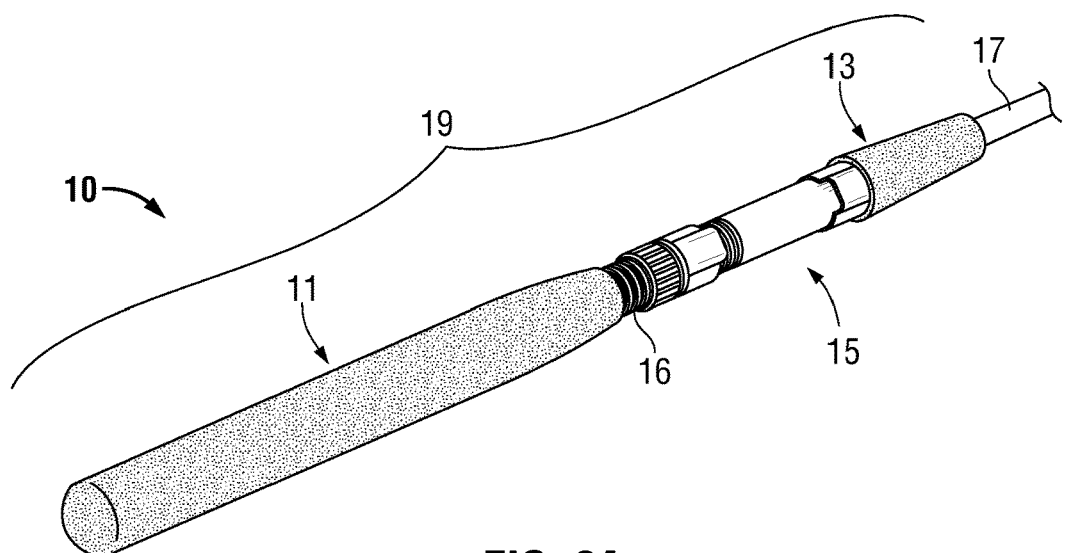
FIGS. 2A-2C are perspective views of fishing rod handle sections in accordance with exemplary embodiments of the disclosure, where

Referring to FIG. 2A, a fishing rod 10 in accordance with an exemplary embodiment of the disclosure is shown. The fishing rod 10 includes a rod blank 17 and a handle section 19 affixed to a proximal end portion of the rod blank 17. The handle section 19 includes a grip 11 and a foregrip 13. In exemplary embodiments, the handle section 19 may take different shapes, forms, and sizes, in addition or as an alternative to the configuration illustrated in FIG. 2A, for example, depending on various factors including targeted fish and/or fishing conditions.

In exemplary embodiments, the rod blank 17 is made in an elongated shape with flexible materials. The rod blank 17 can be made from any of various kinds of elastic materials, such as, for example, glass fiber, carbon fiber, and plastic materials. The rod blank 17 can be made of, for example, fiberglass, carbon fibers, graphite fibers, high modulus, graphite carbon fibers, DAIWA carbon fiber materials, SVF carbon fibers, super SVF carbon fibers, or Z-SVF carbon fibers.

The grip 11 can be manufactured from any suitable materials. The grip 11 can be made from, for example, cork rings, composites, EVA (ethylene-vinyl acetate) foam, natural and synthetic rubber, textured grip tapes, heat shrink tubing, and carbon fiber, which may offer varying levels of comfort, durability, sensitivity, and weight. The foregrip 13 can be manufactured from the same or different materials from the grip 11. It will be appreciated by those skilled in the art that the size, shape, location and material of the foregrip 13 is a matter of design choice and may differ from fishing rod to fishing rod. Alternatively, the fishing rod 10 can be manufactured without a foregrip.

As depicted, the handle section 19 further includes a reel seat 15. In general, the reel seat 15 has a structure in a cylindrical form having a central bore through which a blank rod is to be passed. Reel seat arbors (not shown) can be used to displace and center the distance between the reel seat 15 and the rod blank 17. In an exemplary embodiment of the disclosure, the reel seat 15 is disposed between the distal end of the grip 11 and the proximal end of the foregrip 13 and is aligned with the longitudinal axis (e.g., longitudinal axis A-A shown in FIG. 4) of the rod blank 17. Those of ordinary skill in the art will appreciate that the length of the grip 11 and the location of the reel seat 15 is a matter of design choice and may vary from the configuration shown in FIG. 2B.

In an exemplary embodiment of the disclosure, the reel seat 15 includes a threaded portion 16 at the proximal end thereof and disposed adjacent to the distal end of the grip 11. The reel seat 15 generally includes a tubular body having attached first and second reel foot holders for detachably securing a reel foot thereto. The first reel foot holder (or "movable hood"), which is provided on one end of the tubular body, is movable along the threaded end portion 16 and has an interior region for receiving a leg of a reel foot. The second foot holder (or "fixed hood") is fixedly mounted on another end of the tubular body and has an interior region capable of receiving another leg of the reel foot. In exemplary embodiments of the disclosure, the reel seat 15 includes a fastening element for adjusting a relative position of the movable hood with respect to the fixed hood in the axial direction of the tubular body of the reel seat. In an exemplary embodiment, the fastening element is a nut member, and the movable hood is moved closer to/away from the fixed hood by rotationally operating the nut member along the threaded portion 16.

Figure 2B:
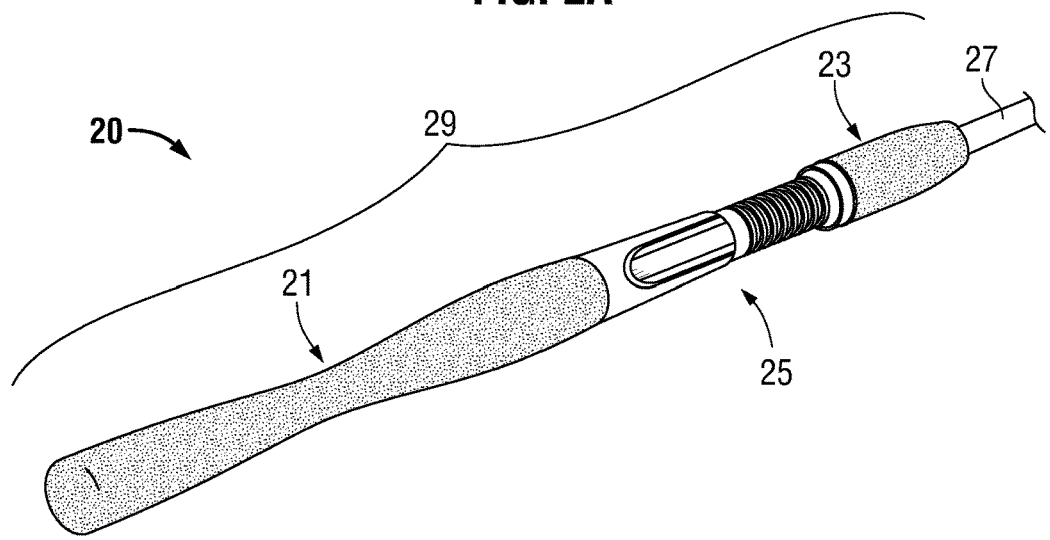

Referring to FIG. 2B, a fishing rod 20 in accordance with an exemplary embodiment of the disclosure is shown. The fishing rod 20 includes a rod blank 27 and a handle section 29 affixed to a proximal end portion of the rod blank 27. The rod blank 27 is similar to the rod blank 17 shown in FIG. 2A and further description thereof is omitted in the interests of brevity.

The handle section 29 includes a grip 21. It will be appreciated that the shape of the grip 21 may vary from the configuration shown in FIG. 2B. The grip 21 is similar to the grip 11 shown in FIG. 2A, except for its shape, and further description thereof is omitted in the interests of brevity. In some exemplary embodiments of the disclosure, the handle section 29 may further include a foregrip 23.

As illustrated in FIG. 2B, the handle section 29 further includes a reel seat 25. In an exemplary embodiment of the disclosure, the reel seat 25 is a hidden thread reel seat and disposed between the distal end of the grip 21 and the proximal end of the foregrip 23. Those of ordinary skill in the art will appreciate that the length of the grip 21 and the type and location of the reel seat 25 is a matter of design choice and may vary from the configuration shown in FIG. 2B.

Figure 2C:
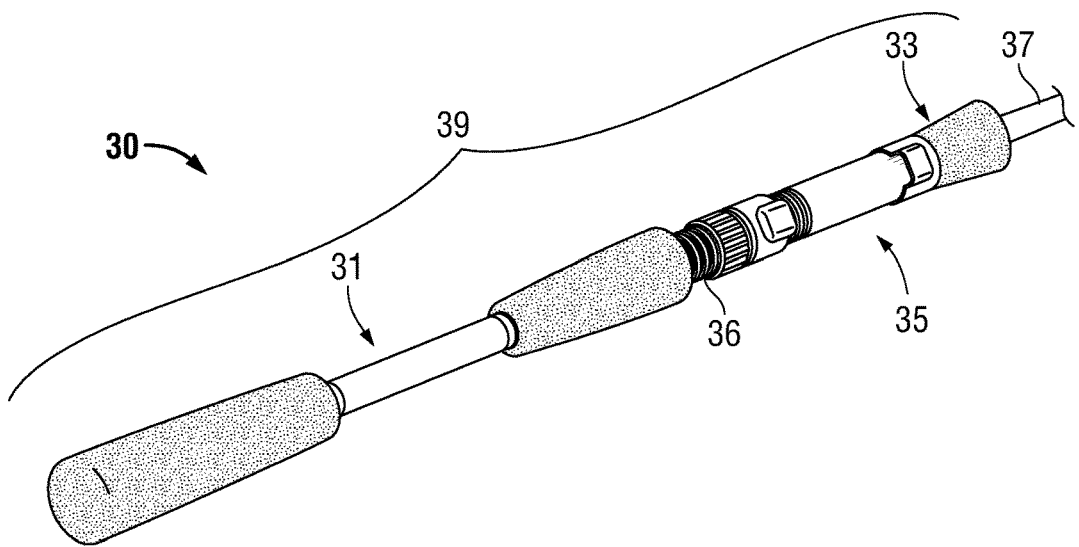

Referring to FIG. 2C, a fishing rod 30 in accordance with an exemplary embodiment of the disclosure is shown. The fishing rod 30 includes a rod blank 37 and a handle section 39 affixed to a proximal end portion of the rod blank 37. The handle section 39 includes a split grip handle 31. It will be appreciated that the size and shape of the split grip 31 may be varied from the configuration depicted in FIG. 2C. In some exemplary embodiments of the disclosure, the handle section 39 may further include a foregrip 33.

The handle section 39 further includes a reel seat 35. In an exemplary embodiment of the disclosure, the reel seat 35 includes a threaded portion 36 at the proximal end thereof and disposed adjacent to the distal end of the split grip 31.

The reel seat 35 is similar to the reel seat 15 shown in FIG. 2A and further description thereof is omitted in the interests of brevity. Those of ordinary skill in the art will appreciate that the length of the split grip 31 and the type and location of the reel seat 35 is a matter of design choice and may vary from the configuration shown in FIG. 2C. In exemplary embodiments, the handle section 39 may take different shapes, forms, and sizes, in addition or as an alternative to the configuration illustrated in FIG. 2C.

FIGS. 3-9 illustrate an exemplary embodiment of the presently-disclosed fishing rod and fishing rod holder, generally indicated by reference numeral 100.

Referring to FIGS. 3, 4, 5A, 6, 7 and 9, the fishing rod and fishing rod holder 100 includes a fishing rod 110 and a fishing rod holder 185. The fishing rod holder 185 can be detachably affixed to the fishing rod 110 by a connection mechanism, indicated schematically by dashed line box 170 in FIGS. 6 and 7.

The fishing rod 110 includes various components of the fishing rod 10 shown in FIG. 2A. For example, the fishing rod 110 includes the rod blank 17, reel seat 15, and foregrip 13 of the fishing rod 10. It is to be understood that other fishing rod configurations may be used in conjunction with the fishing rod holder 185, which may include additional, fewer, or different components than the fishing rod 110 shown in FIGS. 3, 4, 5A, 6, 7 and 9.

Figure 3:
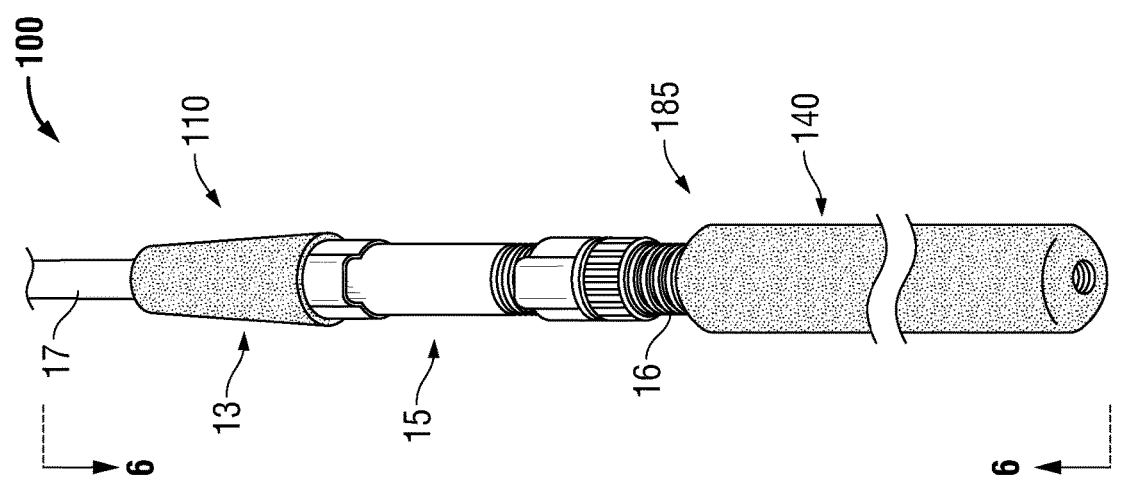
FIG. 3 is a perspective view of a fishing rod and a fishing rod holder detachably attached thereto in accordance with an exemplary embodiment of the disclosure.
Figure 6:
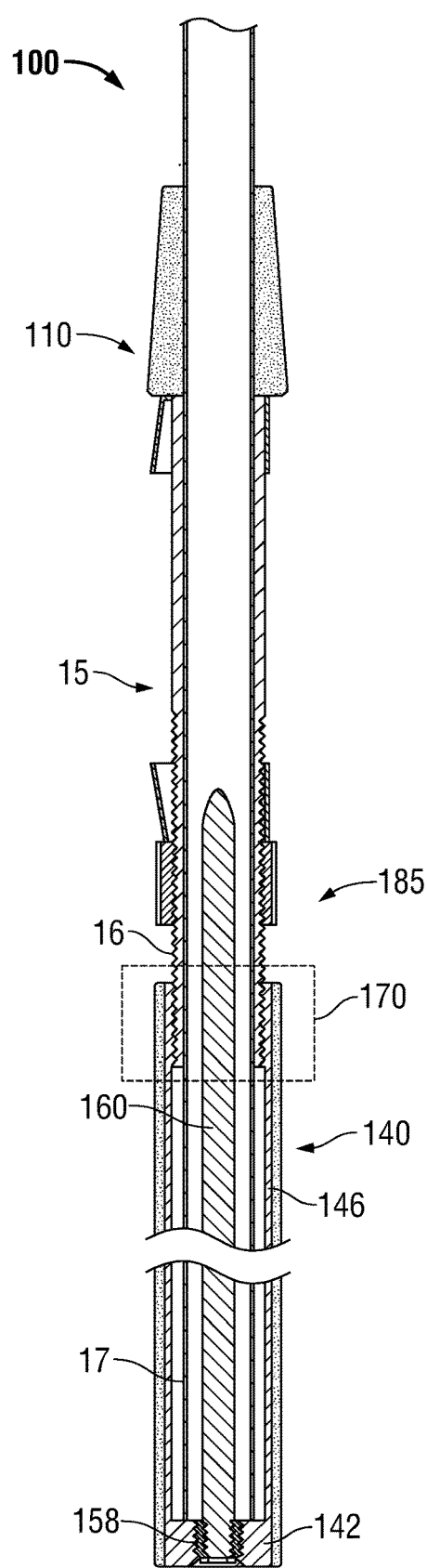
FIG. 6 is a cross sectional view of the fishing rod and fishing rod holder of FIG. 3 taken along line 6-6 of FIG. 3 in accordance with an exemplary embodiment of the disclosure.
Figure 7:
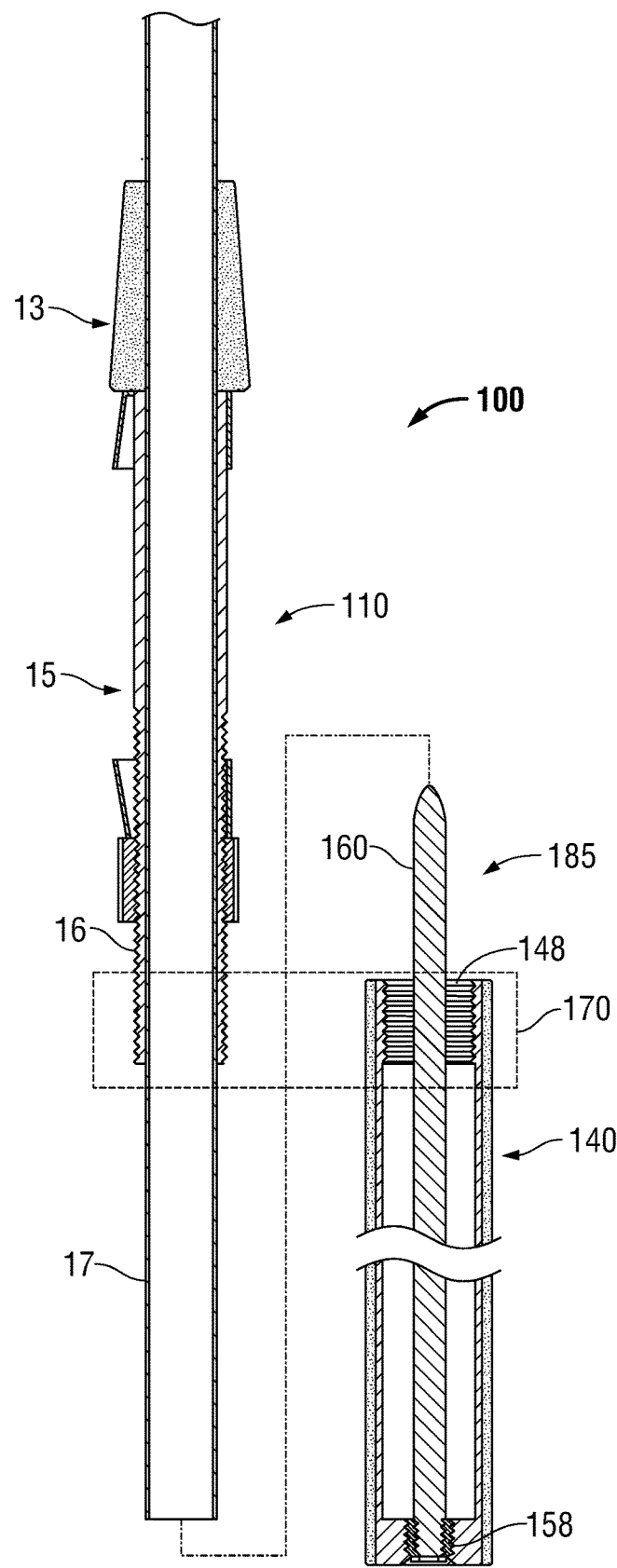
FIG. 7 is a cross sectional view of the fishing rod and fishing rod holder of FIG. 3, shown in a detached and spaced apart configuration of FIG. 4, in accordance with an exemplary embodiment of the disclosure.

In FIGS. 3 and 6, the fishing rod holder 185 is shown detachably attached to the reel seat 15 of the fishing rod 110. In exemplary embodiments of the disclosure, the fishing rod holder 185 is rotatably removably attachable to a proximal end portion of the reel seat 15 of the fishing rod 110. In an exemplary embodiment of the disclosure, the fishing rod holder 185 is configured to be threadedly attachable to the threaded portion 16 of the reel seat 15. In other exemplary embodiments of the disclosure, the fishing rod and fishing rod holder may be configured to be removably attachable using any of a variety of connection mechanisms. Examples of connection mechanisms include, without limitation, threaded connections, push-button locks, spring clips, external levers, internal locks, cam locks, rotary style latches, bayonet style latches, magnetism, quick locks, twist locks, and combination locks. It is to be understood that the particular implementation of the connection mechanism may vary, and the features, structures, or functions of a fishing rod including a fishing rod holder described herein are not limited to any particular implementation of the connection mechanism.

In exemplary embodiments of the disclosure, the connection mechanism 170 may further facilitate an electrical connection as well as a physical connection. For example, the connection mechanism may provide a physical electrical connection that carries electrical current for powering one or more electrical devices (not shown) as well as physically connecting the fishing rod holder 185 to the fishing rod 110. In some exemplary embodiments where the connection mechanism 170 is used to provide a physical electrical connection, the fishing rod holder 185 may include a power source (not shown), one or more sensors (not shown), light emitting diodes (not shown), etc. For example, the power source may be a rechargeable battery.

Figure 4:
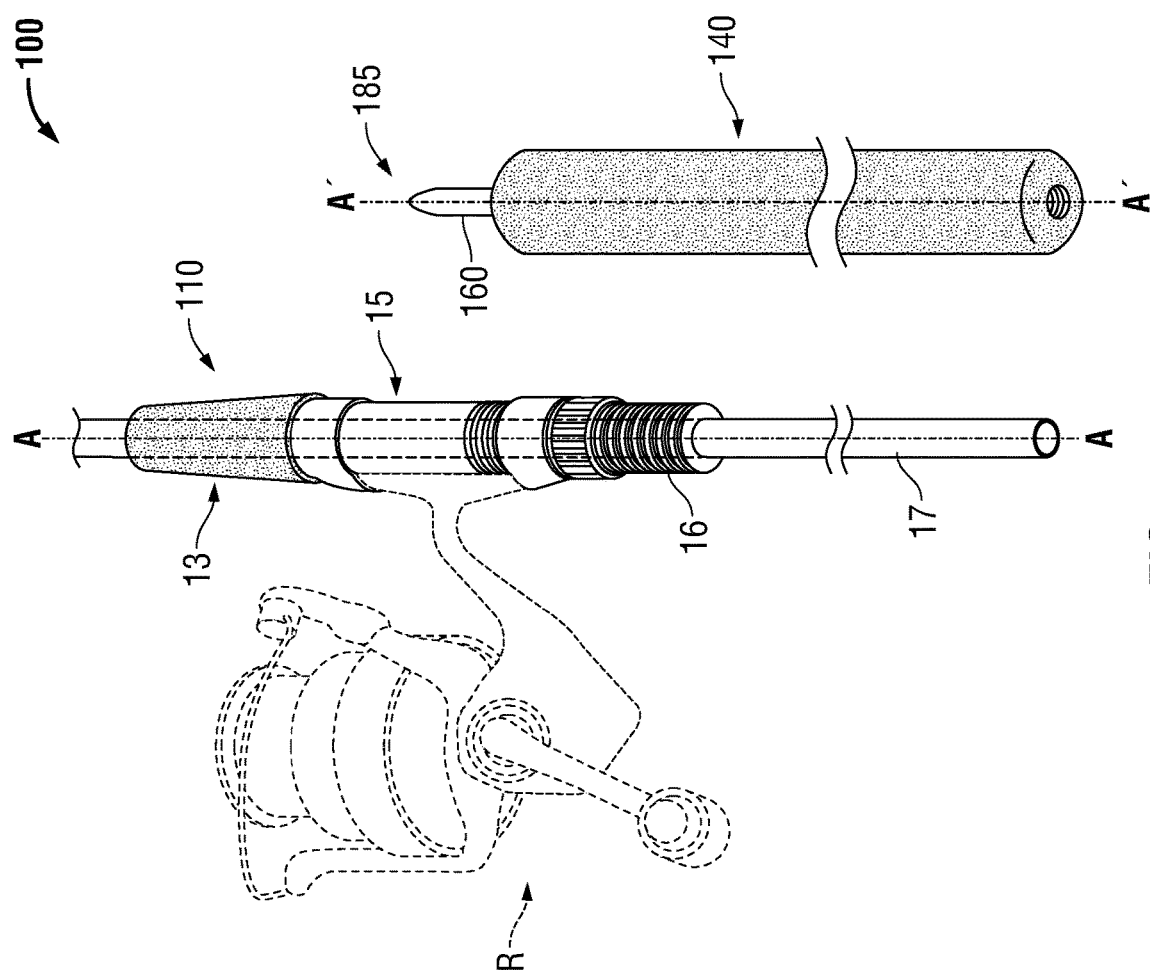
FIG. 4 is a perspective view of the fishing rod and fishing rod holder of FIG. 3 shown in a detached and spaced apart configuration, showing a spike of the fishing rod holder in a stored configuration, and further showing a reel mounted to a reel seat of the fishing rod, with the reel illustrated in phantom lines, in accordance with an exemplary embodiment of the disclosure.

Referring to FIG. 4, the fishing rod and fishing rod holder 100 is shown in a detached and spaced apart configuration. As shown in FIG. 4, a fishing reel "R" (illustrated in phantom lines) is affixed to the reel seat 15 of the fishing rod 110. It will be appreciated that the fishing reel "R" can be any type of fishing reel, such as, for example, any of a variety of spinning and bait casting reels.

The shapes, relative size, and spacing of the fishing rod holder 185 and the foregrip 13 may be varied from the configuration depicted in FIGS. 3 and 4. In other exemplary embodiments of the presently-disclosed fishing rod and fishing rod holder, a fishing rod with no foregrip can used in conjunction with the fishing rod holder 185.

Referring to FIGS. 4, 5A and 6-9, the fishing rod holder 185 generally includes a tubular member 140 and a spike 160. The spike 160 is shown in a deployed configuration in FIGS. 8 and 9. The spike 160 is shown in a stored configuration in FIGS. 4, 6 and 7.

In exemplary embodiments of the disclosure, in the stored configuration, the spike 160 is axially aligned with the longitudinal axis A'-A' of the tubular member 140. In exemplary embodiments of the disclosure, at least a distal end portion of the spike 160 is sized and configured to be receivable within a proximal end portion of the rod blank 17. The spike 160 can made from metal, for example, galvanized steel or aluminum, or other suitable material. In some exemplary embodiments of the disclosure, the spike 160 has a diameter in the range of about 0.125 to 0.375 inches and a length in the range of about 3 to 12 inches. For example, the spike 160 may have a diameter of about 0.25 inches and a length of about 6 inches.

Figure 8:
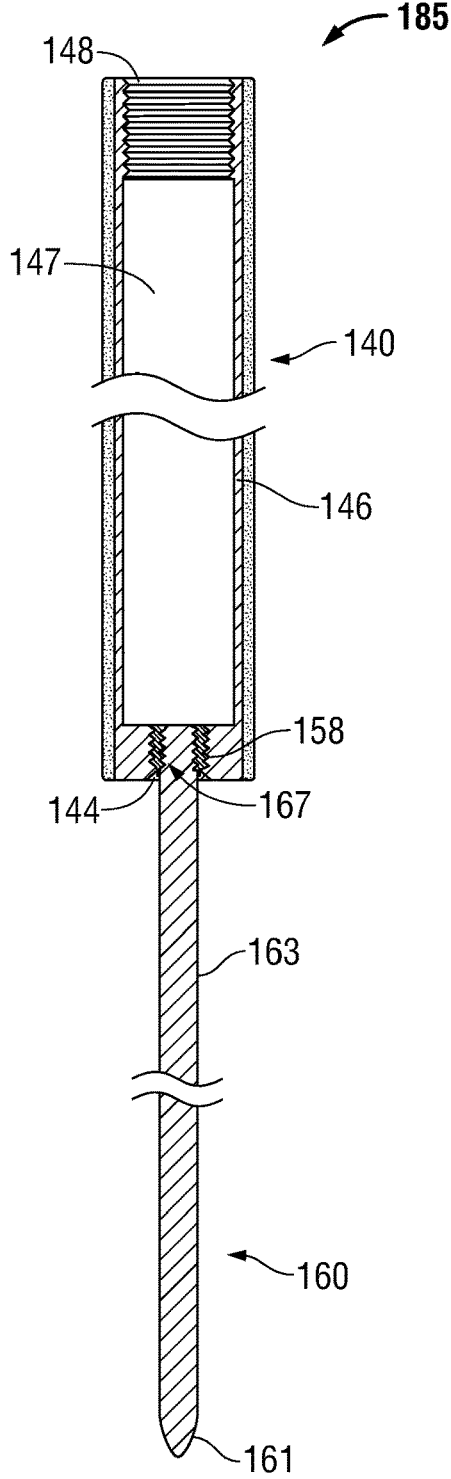
FIG. 8 is a cross sectional view of the fishing rod holder of FIG. 4, with the spike shown in a deployed configuration, in accordance with an exemplary embodiment of the disclosure.

In exemplary embodiments of the disclosure, the spike 160 includes a substantially cylindrical shaft 163. As shown in FIGS. 5A and 8, the shaft 163 includes a tip portion 161 disposed at a first end thereof and a threaded portion 167 disposed at a second, opposing end thereof. In some exemplary embodiments of the disclosure, the threaded portion 167 has a diameter in the range of 0.125 to 0.375 inches and a thread length in the range of 0.25 to 1.5 inches. In some exemplary embodiments of the disclosure, the tip portion 161 has a blunt-nosed tip. In other exemplary embodiments, the tip portion 161 has a relatively sharp termination point. The shaft 163 and the tip portion 161 may have any suitable earth-penetrating shape. In exemplary embodiments of the disclosure, the shaft 163 has a cross-section slidably receivable generally within a proximal end portion of the rod blank 17. Although a substantially cylindrical shaft 163 is shown, it is to be understood that the shape of the shaft 163 may be varied from the configuration depicted in FIGS. 5A and 8. Those of ordinary skill in the art will appreciate that the size, shape, and composition of the spike 160 can vary, for example, depending on the weight of the fishing rod, the size of the rod blank, and the targeted fish and/or fishing conditions. The spike 160 may have a notch (not shown) for a tool, for both tightening and loosening of the spike 160.

Figure 5B:
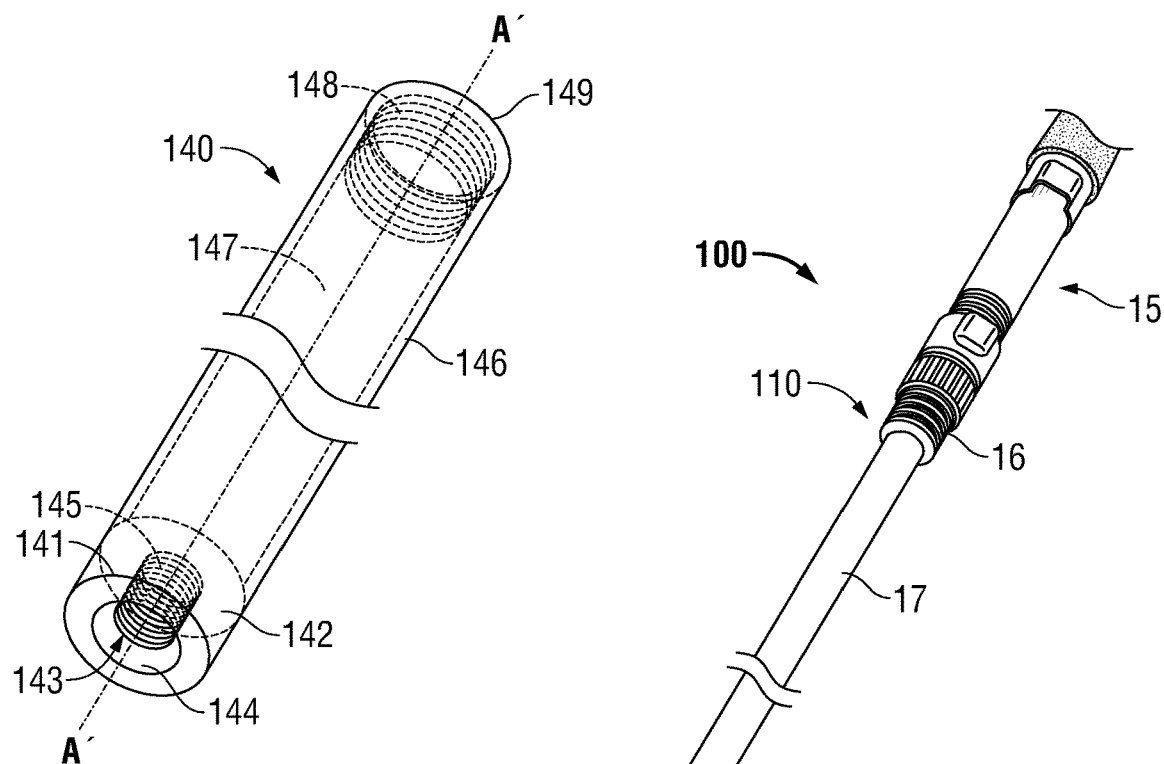
FIG. 5B is an enlarged perspective view of a tubular member of the fishing rod holder of FIG. 5A in accordance with an exemplary embodiment of the disclosure.
Figure 5A:
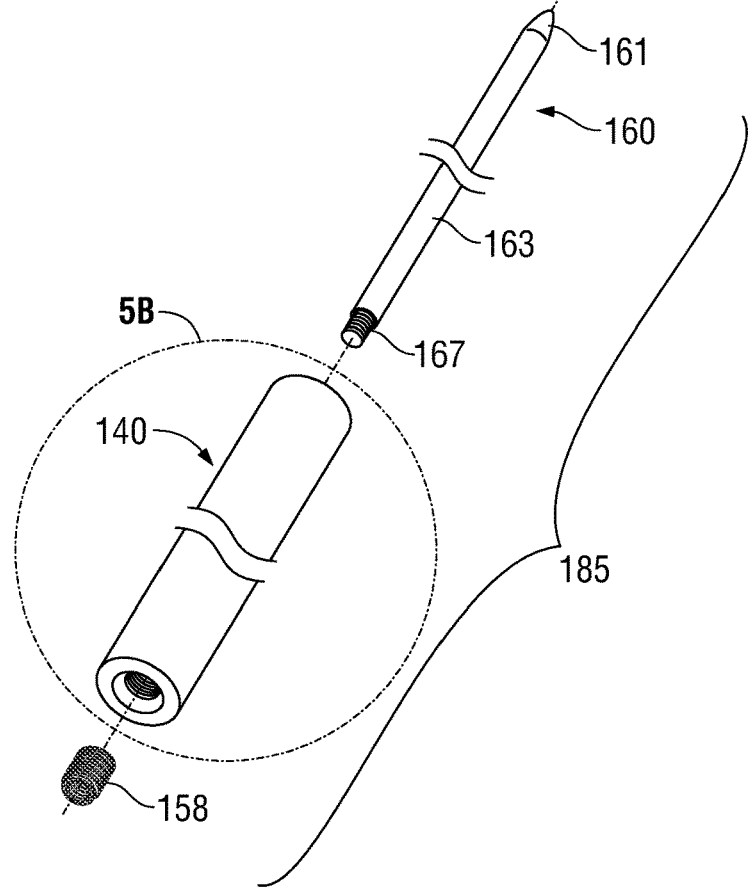
FIG. 5A is an exploded view of the fishing rod holder of FIG. 3, shown aligned with a proximal portion of the handle section of the fishing rod of FIG. 4, in accordance with an exemplary embodiment of the disclosure.

Referring to FIG. 5B, the tubular member 140 includes a proximal end 141 and a distal end 149, with the longitudinal axis A'-A' extending therebetween. In exemplary embodiments of the disclosure, the tubular member 140 includes a first annular wall 142 having a first thickness and a second annular wall 146 having a second thickness. In exemplary embodiments of the disclosure, the first annular wall 142 includes a beveled portion 144 aligned and in communication with the first cavity portion 143, as shown in FIGS. 5B and 8, to accommodate the spike 160 during deployment thereof.

The first annular wall 142 encloses a longitudinally extending first cavity portion 143. In some exemplary embodiments of the disclosure, the first cavity portion 143 is sized and configured to receive a threaded insert 158.

Figure 9:
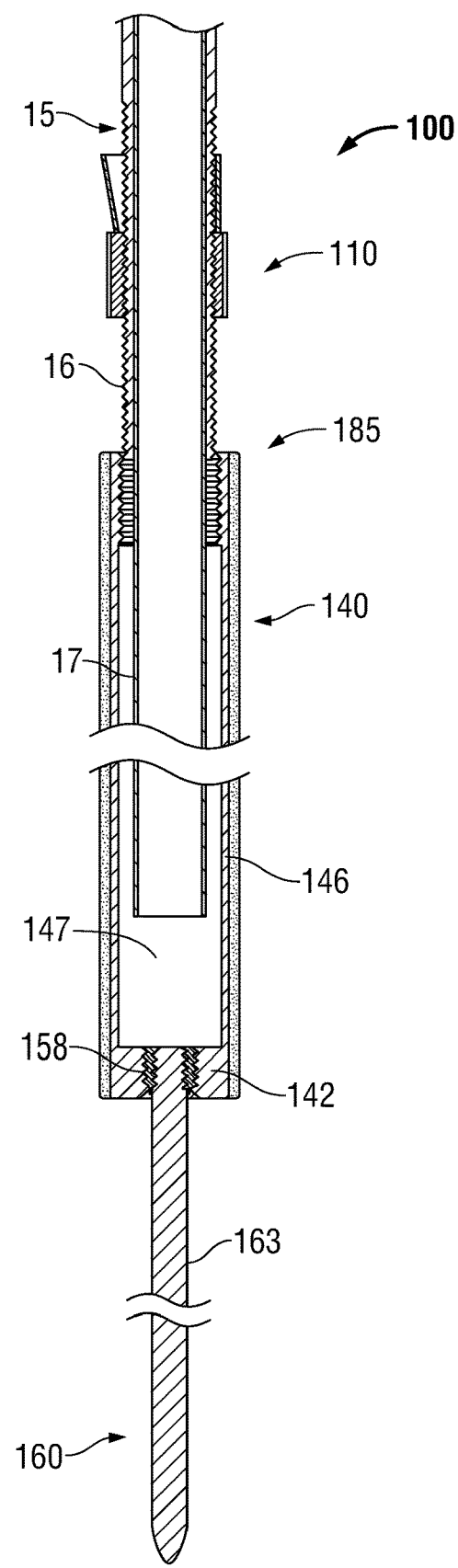
FIG. 9 is a cross sectional view of the fishing rod holder of FIG. 4, with the spike shown in the deployed configuration of FIG. 8, and further showing a proximal end portion of the fishing rod of FIG. 3 supported by the fishing rod holder, in accordance with an exemplary embodiment of the disclosure.

The second annular wall 146 encloses a longitudinally extending second cavity portion 147. The second cavity portion 147 is sized and configured to receive a proximal end portion of the rod blank 17 of the fishing rod 110, as shown in FIG. 9. In exemplary embodiments of the disclosure, the second annular wall 146 includes an internally-threaded end portion 148 longitudinally extending from the distal end 149 of the tubular member 140. The internally-threaded end portion 148 has a predetermined length (or thread length). In exemplary embodiments of the disclosure, the internally-threaded end portion 148 has a diameter in the range of 0.5 to 1.5 inches and a thread length in the range of 0.125 to 0.5 inches.

The tubular member 140 can made from aluminum or other metal, plastic, PVC (polyvinyl chloride) schedule 40 pipe, or other suitable material, and may be formed by any suitable process, such as machining, injection molding, etc. In exemplary embodiments of the disclosure, the tubular member 140 has a diameter in the range of about 0.5 to 1.5 inches and a length in the range of about 2 to 8 inches. In some exemplary embodiments of the disclosure, at least a portion of the tubular member 140 is surrounded by a grip material, such as, for example, cork rings, composites, EVA (ethylene-vinyl acetate) foam, natural and synthetic rubber, textured grip tapes, heat shrink tubing, or carbon fiber.

In some exemplary embodiments of the disclosure, as shown in FIG. 5B, the first annular wall 142 includes an internally-threaded portion 145. The internally-threaded portion 145 of the first annular wall 142 may be configured to mate with external threads of the threaded portion 167 of the spike 160. In some exemplary embodiments of the disclosure, the internally-threaded portion 145 of the first annular wall 142 has a diameter in the range of 0.125 to 0.375 inches and a thread length in the range of 0.25 to 1.5 inches. In other exemplary embodiments of the disclosure, a threaded insert 158 is associated with first cavity portion 143 of the tubular member 140, providing an internally threaded structure for engaging the threaded portion 167 of the spike 160.

In some exemplary embodiments of the disclosure, the threaded insert 158 includes a first open end and a second open end opposite the first open end. In exemplary embodiments of the disclosure, the threaded portion 167 of the spike 160 is engaged with the first open end of the threaded insert 158 when in the stored configuration, and the threaded portion 167 of the spike 160 is engaged with the second open end of the threaded insert 158 when in the deployed configuration. Those of ordinary skill in the art will appreciate that the spike 160 can be detachably affixable to the first annular wall 142 using other types of connectors or fasteners.

The threaded insert 158 can be made from metal such as brass or copper, plastic such as PVC or PTFE (polytetrafluoroethylene), or other suitable material. In exemplary embodiments of the disclosure, the threaded insert 158 has a diameter in the range of 0.125 to 0.375 inches, and has internal threads configured to mate with external threads of the threaded portion 167 of the spike 160. The threaded insert 158 can be installed into the first cavity portion 143 of the tubular member 140 by any suitable process, such as, for example, insert molding, heat insert driver, ultrasonic welding, heat staking, or using a screw driver or other tools. In some exemplary embodiments of the disclosure, the threaded insert 158 may include both external and internal threads, and the internally-threaded portion 145 of the first annular wall 142 may be configured to mate with external threads of the threaded insert 158.

Figure 17:
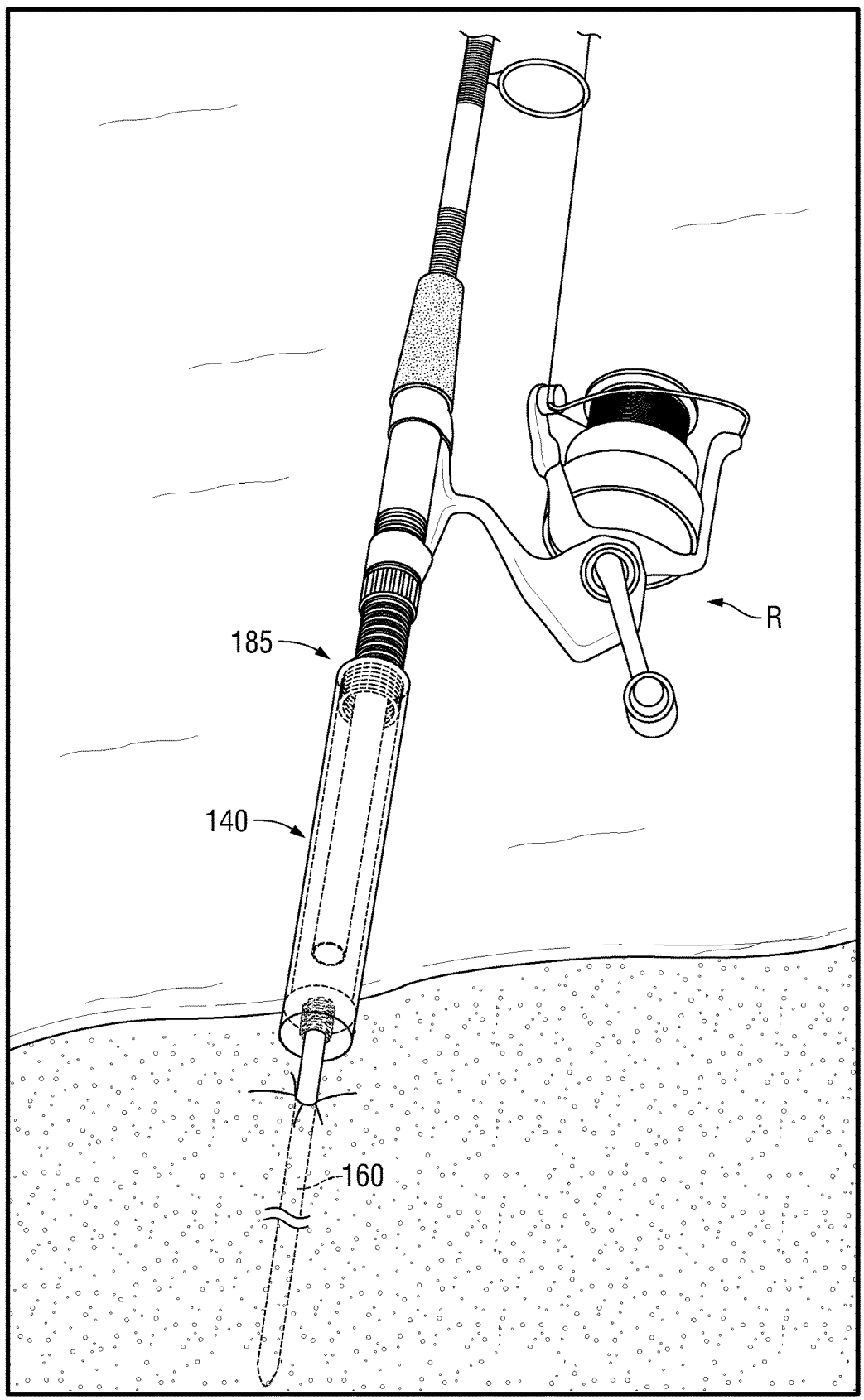
FIG. 17 is a perspective view of a fishing rod holder and a fishing rod in accordance with an exemplary embodiment of the disclosure, with the spike shown in a deployed configuration, and further showing a proximal portion of the fishing rod supported by the fishing rod holder.

In FIG. 9, the fishing rod 110 is shown supported by the fishing rod holder 185. FIG. 9 shows the spike 160 in the deployed configuration, with a proximal end portion of the rod blank 17 of the fishing rod 110 disposed in the second cavity portion 147 of the fishing rod holder 185, and the threaded portion 16 of the reel seat 15 disposed in contact with, and supported by, the distal end 149 of the tubular member 140. According to exemplary embodiments of the disclosure, for example, as illustrated in FIGS. 9 and 17, when the fishing rod 110 is supported by the fishing rod holder 185 during the activity of trying to catch fish (otherwise known as "fishing"), the threaded portion 16 of the reel seat 15 is not engaged with threads of the second annular wall 146 of the tubular member 140 of the fishing rod holder 185.

Figure 10:
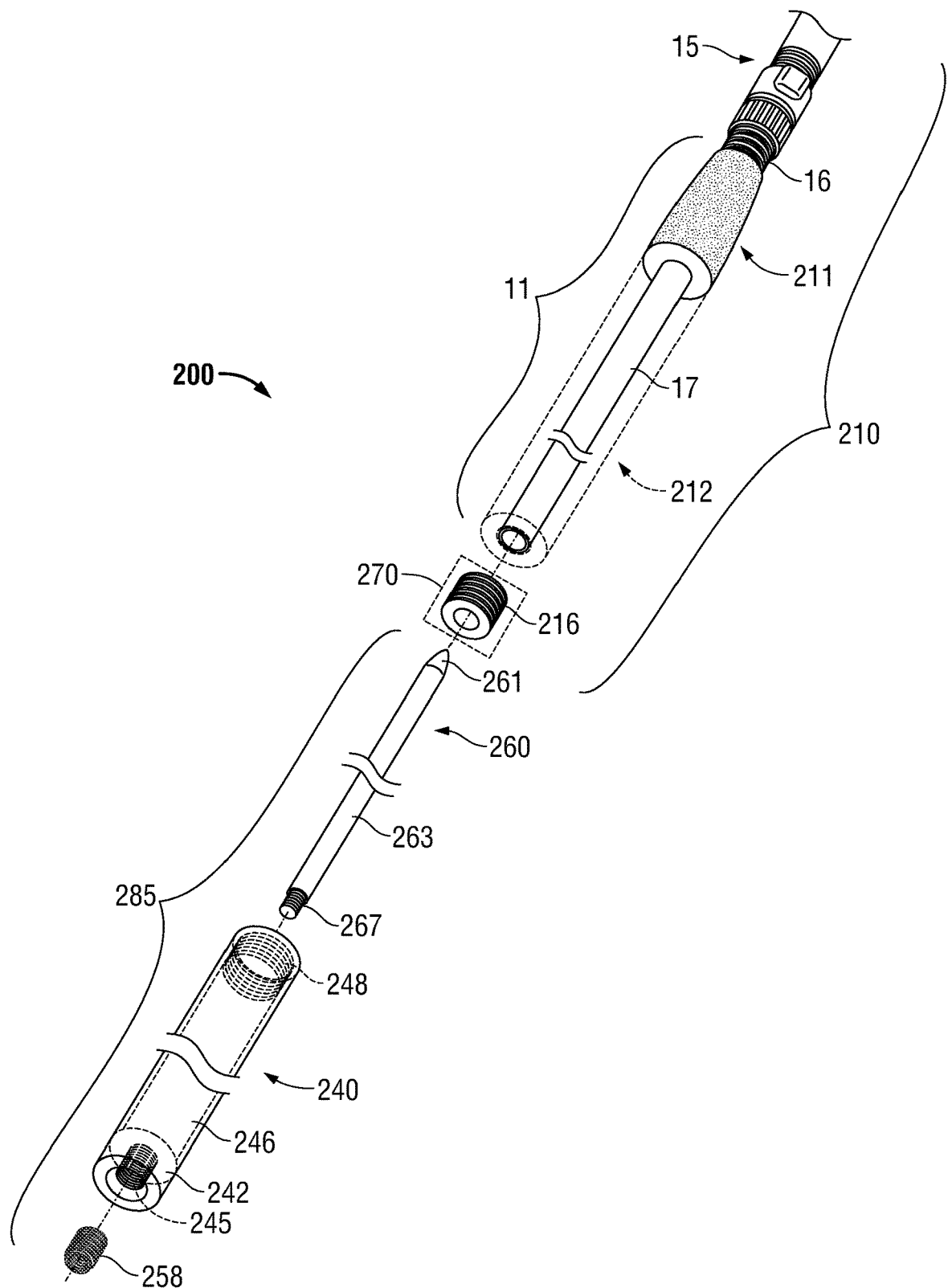
FIG. 10 is an exploded view of a fishing rod holder and a proximal portion of a handle section of a fishing rod in accordance with another exemplary embodiment of the disclosure.

FIG. 10 illustrates an exemplary embodiment of the presently-disclosed fishing rod and fishing rod holder, generally indicated by reference numeral 200. Referring to FIG. 10, the fishing rod and fishing rod holder 200 includes a fishing rod 210 and a fishing rod holder 285. The fishing rod 210 includes various components of the fishing rod 10 shown in FIG. 2A. For example, the fishing rod 110 includes the rod blank 17 and reel seat 15 of the fishing rod 10. The fishing rod 210 includes a first grip portion 211. However, a second grip portion 212 (illustrated in phantom lines in FIG. 10) is absent, as compared to the full grip 11 of the fishing rod 10 shown in FIG. 2A. It will be appreciated that the size and shape of the first grip portion 211 may be varied from the configuration depicted in FIG. 10.

The fishing rod 210 further includes a connection mechanism 270, indicated schematically by dashed line box 270 in FIG. 10. In an exemplary embodiment of the disclosure, shown in FIG. 10, the connection mechanism 270 includes an externally-threaded tubular connector 216. In other implementations of the connection mechanism, the connection mechanism 270 includes one or more threaded connectors, push-button locks, spring clips, external levers, internal locks, cam locks, rotary style latches, bayonet style latches, magnetism, quick locks, twist locks, combination locks, or other connectors or fasteners. In exemplary embodiments of the disclosure, the externally-threaded tubular connector 216 is suitably sized to enclose a portion of the rod blank 17. In some exemplary embodiments of the disclosure, the externally-threaded tubular connector 216 has an outer diameter in the range of 0.5 to 1.5 inches, a thread length in the range of 0.125 to 1 inch, and an inner diameter in the range of 0.125 to 1 inch. The externally-threaded tubular connector 216 can be made from metal, plastic such as PVC or PTFE, or other suitable material.

The externally-threaded tubular connector 216 can be affixed to the rod blank 17 using an adhesive material, for example, epoxy adhesive, resin adhesive, cyanoacrylate, or any substance that is capable of holding materials together in a functional manner by surface attachment that resists separation, or by other suitable bonding means. In exemplary embodiments of the disclosure, the externally-threaded tubular connector 216 may be part of a kit for modifying a conventional fishing rod to allow the fishing rod holder 285 to be detachably affixed to the modified fishing rod.

The fishing rod holder 285 generally includes a tubular member 240 and a spike 260. In exemplary embodiments of the disclosure, the tubular member 240 includes a first annular wall 242 having a first thickness and a second annular wall 246 having a second thickness. In exemplary embodiments of the disclosure, the second annular wall 246 includes an internally-threaded end portion 248 longitudinally extending from the distal end of the tubular member 240. In exemplary embodiments of the disclosure, the internally-threaded end portion 248 is configured to mate with the externally-threaded tubular connector 216. The internally-threaded end portion 248 has a predetermined length (or thread length) extending from the distal end of the tubular member 240. In exemplary embodiments of the disclosure, the internally-threaded end portion 248 has a diameter in the range of 0.5 to 1.5 inches and a thread length in the range of 0.125 to 0.5 inches.

In exemplary embodiments of the disclosure, the spike 260 includes a substantially cylindrical shaft 263. As shown in FIG. 10, the shaft 263 includes a tip portion 261 disposed at a first end thereof and a threaded portion 267 disposed at a second, opposing end thereof. In some exemplary embodiments of the disclosure, the first annular wall 242 of the tubular member 240 includes an internally-threaded portion 245 configured to mate with external threads of the threaded portion 267 of the spike 260. In other exemplary embodiments of the disclosure, a threaded insert 258 is associated with the first annular wall 242 of the tubular member 240, providing an internally-threaded structure for engaging the threaded portion 267 of the spike 260. The tubular member 240, threaded insert 258, and spike 260 are similar to the tubular member 140, threaded insert 158, and spike 160, respectively, shown in FIG. 5A and further description thereof is omitted in the interests of brevity.

Referring to FIG. 11, a fishing rod 220 in accordance with an exemplary embodiment of the disclosure is shown. The fishing rod 220 includes various components of the fishing rod 20 shown in FIG. 2B. For example, the fishing rod 220 includes the rod blank 27, reel seat 25, and foregrip 23 of the fishing rod 20. The fishing rod 220 includes a first grip portion 221. However, a second grip portion 222 (illustrated in phantom lines in FIG. 11) is absent, as compared to the full grip 21 of the fishing rod 20 shown in FIG. 2B. It will be appreciated that the size and shape of the first grip portion 221 may be varied from the configuration depicted in FIG. 11.

FIG. 12 illustrates an exemplary embodiment of the presently-disclosed fishing rod and fishing rod holder, generally indicated by reference numeral 300. In the exemplary embodiment shown in FIG. 12, the fishing rod and fishing rod holder 300 includes a fishing rod 320 and a fishing rod holder 385. The fishing rod 320 is similar to the fishing rod 220 shown in FIG. 11, except for the externally-threaded tubular connector 316. Although the fishing rod 320 is shown, it is to be understood that other fishing rod configurations may be used, which may include additional, fewer, or different components than shown in FIG. 12.

As shown in FIG. 12, the fishing rod holder 385 includes a tubular member 340 and a spike 360. The spike 360 is similar to the spike 160 shown in FIG. 5A and further description thereof is omitted in the interests of brevity. In exemplary embodiments of the disclosure, the tubular member 340 includes a first annular wall 342 having a first thickness and a second annular wall 346 having a second thickness.

In exemplary embodiments of the disclosure, the first annular wall 342 includes an internally-threaded portion 345. The internally-threaded portion 345 of the first annular wall 342 may be configured to mate with external threads of the threaded portion 367 of the spike 360. In exemplary embodiments of the disclosure, the second annular wall 346 includes an internally-threaded end portion 348 longitudinally extending from the distal end of the tubular member 340. In exemplary embodiments of the disclosure, the internally-threaded end portion 348 is configured to mate with the externally-threaded tubular connector 316. The internally-threaded end portion 348 has a predetermined length (or thread length) from the distal end of the tubular member 340. In exemplary embodiments of the disclosure, the internally-threaded end portion 348 has a diameter in the range of 0.5 to 1.5 inches and a thread length in the range of 0.125 to 0.5 inches. The tubular member 340 is similar to the tubular member 140 shown in FIG. 5B and further description thereof is omitted in the interests of brevity.

In exemplary embodiments of the disclosure, the fishing rod holder 385 can be detachably affixed to the fishing rod 320 by a connection mechanism, indicated schematically by dashed line box 370 in FIG. 12. In the exemplary embodiment shown in FIG. 12, the connection mechanism includes the internally-threaded end portion 348 of the tubular member 340 and the externally-threaded tubular connector 316 of the fishing rod 320. In other exemplary embodiments of the disclosure, the fishing rod 320 and fishing rod holder 385 may be configured to be removably attachable using any of a variety of connection mechanisms. Examples of connection mechanisms include, without limitation, threaded connections, push-button locks, spring clips, external levers, internal locks, cam locks, rotary style latches, bayonet style latches, magnetism, quick locks, twist locks, and combination locks.

In exemplary embodiments of the disclosure, the externally-threaded tubular connector 316 has an outer diameter in the range of 0.5 to 1.5 inches and a thread length in the range of 0.125 to 1 inch. In exemplary embodiments of the disclosure, the externally-threaded tubular connector 316 has an inner diameter in the range of 0.125 to 1 inch, or suitably sized for the externally-threaded tubular connector 316 to enclose a portion of the rod blank 27.

The externally-threaded tubular connector 316 can be affixed to the rod blank 27 using an adhesive material, for example, epoxy adhesive or resin adhesive, or by other suitable bonding means. In exemplary embodiments of the disclosure, the externally-threaded tubular connector 316 may be part of a kit for modifying a conventional fishing rod to allow the fishing rod holder 385 to be detachably affixed to the modified fishing rod.

Referring to FIG. 13, a fishing rod 330 in accordance with an exemplary embodiment of the disclosure is shown. The fishing rod 330 includes various components of the fishing rod 30 shown in FIG. 2C. For example, the fishing rod 330 includes the rod blank 37, reel seat 35, and foregrip 33 of the fishing rod 30. The fishing rod 330 includes a first grip portion 311. However, a second grip portion 312 (illustrated in phantom lines in FIG. 13) is absent, as compared to the split grip 31 of the fishing rod 30 shown in FIG. 2C.

FIG. 14 illustrates an exemplary embodiment of the presently-disclosed fishing rod and fishing rod holder, generally indicated by reference numeral 400. In the exemplary embodiment shown in FIG. 14, the fishing rod and fishing rod holder 400 includes a fishing rod 430 and a fishing rod holder 485. The fishing rod 430 is similar to the fishing rod 330 shown in FIG. 13, except for the externally-threaded tubular connector 416. Although the fishing rod 430 is shown, it is to be understood that other fishing rod configurations may be used, which may include additional, fewer, or different components than shown in FIG. 14.

As shown in FIG. 14, the fishing rod holder 485 includes a tubular member 440 and a spike 460. The spike 460 is similar to the spike 160 shown in FIG. 5A and further description thereof is omitted in the interests of brevity. The tubular member 440 is similar to the tubular member 140 shown in FIG. 5B and further description thereof is omitted in the interests of brevity.

In exemplary embodiments of the disclosure, the fishing rod holder 485 can be detachably affixed to the fishing rod 430 by a connection mechanism, indicated schematically by dashed line box 470 in FIG. 14. In the exemplary embodiment shown in FIG. 14, the connection mechanism includes the internally-threaded end portion of the tubular member 440 and the externally-threaded tubular connector 416 of the fishing rod 430. In other exemplary embodiments of the disclosure, the fishing rod 430 and fishing rod holder 485 may be configured to be removably attachable using any of a variety of connection mechanisms. The externally-threaded tubular connector 416 is similar to the externally-threaded tubular connector 316 shown in FIG. 12 and further description thereof is omitted in the interests of brevity.

FIGS. 15A and 15B illustrate an exemplary embodiment of a fishing rod holder, generally indicated by reference numeral 1585. The fishing rod holder 1585 includes a tubular member 1540 and a spike 1560. The spike 1560 has a stored configuration and a deployed configuration.

In exemplary embodiments of the disclosure, the tubular member 1540 includes a first annular wall 1542 having a first thickness and a second annular wall 1546 having a second thickness. In exemplary embodiments of the disclosure, the second annular wall 1546 includes an internally-threaded end portion 1548.

FIG. 15A shows the fishing rod holder 1585 with the spike 1560 in the deployed configuration. In FIG. 15B, the spike 1560 of the fishing rod holder 1585 of FIG. 15A is shown detached and spaced apart from the tubular member 1540. Referring to FIGS. 15A and 15B, the spike 1560 includes a threaded portion 1567 and a flange 1568 disposed proximate thereto. In the illustrated embodiment, the first annular wall 1542 includes an inset cavity 1544, sized to receive the flange 1568, at the proximal end of the tubular member 1540.

The spike 1560 can made from metal, for example, galvanized steel or aluminum, or other suitable material. In some exemplary embodiments of the disclosure, the spike 1560 has a diameter in the range of about 0.125 to 0.375 inches and a length in the range of about 3 to 12 inches. In exemplary embodiments of the disclosure, the flange 1568 has a substantially circular shape having a diameter of less than the diameter of the internally-threaded end portion 1548 of the second annular wall 1546 of the tubular member 1540.

FIG. 16 illustrates another exemplary embodiment of a fishing rod holder, generally indicated by reference numeral 1685. The fishing rod holder 1685 includes a tubular member 1640 and a spike 1660. As shown in FIG. 16, the spike 1660 includes a threaded portion 1667 and a flange 1668 disposed proximate thereto. The spike 1660 has a stored configuration and a deployed configuration.

In exemplary embodiments of the disclosure, the tubular member 1640 includes a first annular wall 1642 having a first thickness and a second annular wall 1646 having a second thickness. In exemplary embodiments of the disclosure, the second annular wall 1646 includes an internally-threaded end portion 1648.

In FIG. 16, the spike 1660 of the fishing rod holder 1685 is shown in a deployed configuration. The spike 1660 can made from metal, for example, galvanized steel or aluminum, or other suitable material. In some exemplary embodiments of the disclosure, the spike 1660 has a diameter in the range of about 0.125 to 0.375 inches and a length in the range of about 3 to 12 inches. In exemplary embodiments of the disclosure, the flange 1668 has a substantially circular shape having a diameter of less than the diameter of the internally-threaded end portion 1648 of the second annular wall 1646 of the tubular member 1640.

FIG. 17 shows an exemplary embodiment of the presently-disclosed fishing rod holder and fishing rod holder. In the exemplary embodiment shown in FIG. 17, the fishing rod holder 185 includes a tubular member 140 and a spike 160. In FIG. 17, the spike 160 is shown in a deployed configuration. The fishing rod includes a reel "R" affixed to the reel seat of the fishing rod. The fishing reel "R" can be any type of fishing reel, such as, for example, any of a variety of spinning and bait casting reels.

As shown in FIG. 17, a proximal end portion of the fishing rod is supported by the fishing rod holder 185. It is to be understood that other fishing rod configurations may be used in conjunction with the fishing rod holder 185, which may include additional, fewer, or different components than the fishing rod shown in FIG. 17.

Although exemplary embodiments have been described in detail with reference to the accompanying drawings for the purpose of illustration and description, it is to be understood that the disclosed fishing rod holders and the disclosed fishing rods including a fishing rod holder are not to be construed as limited thereby. It will be apparent to those of ordinary skill in the art that various modifications to the foregoing exemplary embodiments may be made without departing from the scope of the present invention, which is defined, not by the detailed description and embodiments, but by the appended claims and their equivalents. Further, the various features of the embodiments disclosed herein can be used alone, or in varying combinations with each other and are not intended to be limited to the specific combination described herein.

What is claimed is:

1. A fishing rod comprising:
   a rod blank, wherein the rod blank includes an exposed proximal end portion;
   a handle section associated with the rod blank;
   a fishing rod holder removably attachable to a proximal portion of the handle section, the fishing rod holder including:
      a tubular member including a first annular wall enclosing a longitudinally extending first cavity portion and a second annular wall enclosing a longitudinally extending second cavity portion; and
      a spike detachably affixable to the tubular member; and
   a connection mechanism configured to detachably affix the fishing rod holder to the proximal portion of the handle section, wherein the exposed proximal end portion of the rod blank extends proximally outward of the connection mechanism, wherein the connection mechanism includes a threaded tubular connector, and wherein the second annular wall includes a threaded portion configured to mate with the threaded tubular connector.

2. The fishing rod of claim 1, wherein the second cavity portion is sized and configured to receive at least a portion of the exposed proximal end portion of the rod blank therein.

3. The fishing rod of claim 2, wherein when the at least a portion of the exposed proximal end portion of the rod blank is disposed within the second cavity portion, the connection mechanism is in a disengaged configuration to freely permit removal of the fishing rod from the fishing rod holder.

4. The fishing rod of claim 1, wherein at least a portion of the spike is sized and configured to be receivable within the exposed proximal end portion of the rod blank.

5. The fishing rod of claim 1, wherein the spike includes a threaded portion, and wherein the first annular wall includes a threaded portion configured to mate with the threaded portion of the spike, and wherein the threaded portion of the first annular wall includes a first open end and a second open end opposite the first open end.

6. The fishing rod of claim 5, wherein when the spike is in a stored configuration, the threaded portion of the spike is engaged with the first open end of the threaded portion of the first annular wall, and wherein when the spike is in a deployed configuration, the threaded portion of the spike is engaged with the second open end of the threaded portion of the first annular wall.

7. A fishing rod comprising:
   a rod blank;
   a handle section associated with the rod blank;
   a fishing rod holder removably attachable to a proximal portion of the handle section, the fishing rod holder including:
      a first annular wall enclosing a longitudinally extending first cavity portion;
      a second annular wall enclosing a longitudinally extending second cavity portion, wherein the second cavity portion is sized and configured to receive a proximal end portion of the rod blank therein; and
      a spike including a threaded portion, the spike having a stored configuration and a deployed configuration; and
   a connection mechanism configured to detachably affix the fishing rod holder to the proximal portion of the handle section, wherein the connection mechanism includes a threaded tubular connector enclosing a portion of the rod blank, and wherein when the spike is in the deployed configuration and the proximal end portion of the rod blank is disposed in the second cavity portion, the connection mechanism is in a disengaged configuration to freely permit removal of the fishing rod from the fishing rod holder.

8. The fishing rod of claim 7, wherein the connection mechanism further includes a threaded end portion of the second annular wall.

9. The fishing rod of claim 7, wherein the first annular wall includes a threaded portion configured to mate with the threaded portion of the spike, and wherein the threaded portion of the first annular wall includes a first open end and a second open end opposite the first open end.

10. The fishing rod of claim 9, wherein the threaded portion of the spike is engaged with the first open end of the threaded portion of the first annular wall when the spike is in the stored configuration, and wherein the threaded portion of the spike is engaged with the second open end of the threaded portion of the first annular wall when the spike is in the deployed configuration.

11. The fishing rod of claim 7, wherein the second annular wall fully encircles the longitudinally extending second cavity portion.

12. A fishing rod comprising:
   a rod blank;
   a handle section associated with the rod blank;
   a fishing rod holder removably attachable to a proximal portion of the handle section, the fishing rod holder including:
      a tubular member adapted to allow insertion and removal of a proximal end portion of the rod blank therein and therefrom, wherein the tubular member includes:
         a first threaded end portion, the first threaded end portion including a first open end and a second open end opposite the first open end; and
         a second threaded end portion; and a spike having a threaded portion, the spike having a stored configuration and a deployed configuration, wherein the threaded portion of the spike is engaged with the first open end of the first threaded end portion when in the stored configuration, and wherein the threaded portion of the spike is engaged with the second open end of the first threaded end portion when in the deployed configuration; and a connection mechanism configured to detachably affix the fishing rod holder to the proximal portion of the handle section, wherein when the fishing rod holder is detachably affixed to the proximal portion of the handle section by the connection mechanism, at least a portion of the spike is disposed in the proximal end portion of the rod blank when the spike is in the stored configuration.

13. The fishing rod of claim 12, wherein the connection mechanism includes a threaded tubular connector enclosing a portion of the rod blank.

14. The fishing rod of claim 13, wherein the connection mechanism further includes the second threaded end portion.

15. The fishing rod of claim 14, wherein the second threaded end portion is configured to mate with the threaded tubular connector.

* * * * *